(12) United States Patent
Ohkawa

(10) Patent No.: US 8,745,009 B2
(45) Date of Patent: *Jun. 3, 2014

(54) INFORMATION PROCESSOR, INFORMATION PROCESSING SYSTEM, DATA ARCHIVING METHOD, AND DATA DELETION METHOD

(75) Inventor: Masahiro Ohkawa, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,487

(22) Filed: Mar. 13, 2012

(65) Prior Publication Data

US 2012/0173491 A1 Jul. 5, 2012

Related U.S. Application Data

(63) Continuation of application No. 12/972,565, filed on Dec. 20, 2010.

(30) Foreign Application Priority Data

Jan. 20, 2010 (JP) .................................... 2010-9870

(51) Int. Cl.
*G06F 17/00* (2006.01)
*G06F 17/30* (2006.01)
*G06F 13/00* (2006.01)

(52) U.S. Cl.
CPC ............... *G06F 17/00* (2013.01); *G06F 17/30* (2013.01); *G06F 13/00* (2013.01)
USPC ........... 707/662; 707/661; 707/668; 707/671; 707/802; 711/161

(58) Field of Classification Search
CPC .......... G06F 17/00; G06F 17/30; G06F 13/00
USPC .......... 711/160–164; 707/615–620, 640–648, 707/661–666, 667–668, 802–803, 670–673
See application file for complete search history.

(56) References Cited

U.S. PATENT DOCUMENTS 5,638,508 A * 6/1997 Kanai et al. .................... 714/20
5,812,840 A * 9/1998 Shwartz ............................ 1/1

(Continued)

FOREIGN PATENT DOCUMENTS

EP 2113852 * 11/2009
JP H04-195559 A 7/1992

(Continued)

OTHER PUBLICATIONS

Non-Final Office Action for U.S. Appl. No. 12/972,565, mailed Jun. 21, 2012, 25 pages, U.S. Patent and Trademark Office.

(Continued)

*Primary Examiner* — Srirama Channavajjala
(74) *Attorney, Agent, or Firm* — Jordan IP Law, LLC

(57) ABSTRACT

An information processor may include a command receiving unit that receives an immediate processing command in which a deletion target to be deleted from the database is conditioned, and a registration processing unit that registers information defining the deletion target into a management data unit. In addition, the information processor may include a deletion processing unit that deletes the deletion target from a database, and deregisters the deleted deletion target from the management data unit. The information processor can also include a data manipulation command processing unit, which, in the case where a data manipulation command having a manipulation target that coincides with a table of the deletion target registered in the management data unit is received, processes the data manipulation command in a state where a condition to exclude the deletion target from the manipulation target is added to the data manipulation command.

10 Claims, 16 Drawing Sheets

(56) References Cited

U.S. PATENT DOCUMENTS

| | | | |
|---|---|---|---|
| 5,832,481 A * | 11/1998 | Sheffield | 1/1 |
| 5,842,196 A * | 11/1998 | Agarwal et al. | 1/1 |
| 6,014,674 A * | 1/2000 | McCargar | 1/1 |
| 6,615,223 B1 * | 9/2003 | Shih et al. | 707/625 |
| 6,678,698 B2 * | 1/2004 | Fredell et al. | 707/608 |
| 6,952,692 B1 | 10/2005 | Bhattiprolu et al. | |
| 6,980,987 B2 * | 12/2005 | Kaminer | 707/662 |
| 8,185,578 B2 * | 5/2012 | Inagaki et al. | 709/203 |
| 2004/0128299 A1 * | 7/2004 | Skopec et al. | 707/100 |
| 2004/0167936 A1 | 8/2004 | Yokouchi | |
| 2004/0199512 A1 | 10/2004 | Cornwell et al. | |
| 2004/0205066 A1 * | 10/2004 | Bhattacharjee et al. | 707/8 |
| 2005/0165818 A1 * | 7/2005 | Cole et al. | 707/101 |
| 2005/0193042 A1 * | 9/2005 | Steinmaier et al. | 707/204 |
| 2006/0149796 A1 | 7/2006 | Aalmink | |
| 2006/0235902 A1 * | 10/2006 | Kapur | 707/202 |
| 2007/0118573 A1 | 5/2007 | Gadiraju | |
| 2007/0185834 A1 * | 8/2007 | Dunn | 707/3 |
| 2008/0034018 A1 | 2/2008 | Cisler et al. | |
| 2008/0077584 A1 | 3/2008 | Bachmann et al. | |
| 2008/0306904 A1 | 12/2008 | Fukuda et al. | |
| 2009/0037439 A1 | 2/2009 | Effern | |
| 2009/0157623 A1 * | 6/2009 | Bedi et al. | 707/3 |
| 2009/0157775 A1 * | 6/2009 | Pederson et al. | 707/204 |
| 2009/0187612 A1 | 7/2009 | Kaijima et al. | |

FOREIGN PATENT DOCUMENTS

| | | | |
|---|---|---|---|
| JP | H11-219306 A | | 8/1999 |
| JP | 2005-084974 A | | 3/2005 |
| WO | WO 02/095632 | * | 11/2002 |
| WO | 2005/086003 A1 | | 9/2005 |
| WO | WO 2010/122606 | * | 10/2010 |

OTHER PUBLICATIONS

Final Office Action for U.S. Appl. No. 12/972,565, mailed Dec. 5, 2012, 30 pages, U.S. Patent and Trademark Office.

* cited by examiner

MSG TABLE

| DATE | LEVEL | MESSAGE |
|---|---|---|
| 200x-11-03 | W | WARNING. |
| 200x-05-10 | W | ERROR OCCURRED. |
| 200x-01-12 | I | NOW OPERATING. |
| 200x-11-15 | W | ERROR OCCURRED. |

FIG. 4A

IMMEDIATE DELETION TABLE

| TARGET TABLE NAME | TARGET AREA | LOCK IDENTIFIER |
|---|---|---|
| MSG | DATE<' 200x-01-01' | |
| | | |

FIG. 4B

```
IMMEDIATE DELETION LOCK VARIABLE
DELETE_IMMEDIATE_LOCK
VALUE  NOLOCK     (DEFAULT)
       LOCK
```

FIG. 4C

INFORMATION PROCESSOR, INFORMATION PROCESSING SYSTEM, DATA ARCHIVING METHOD, AND DATA DELETION METHOD

CROSS-REFERENCE TO RELATED APPLICATIONS

The present application is a continuation of U.S. patent application Ser. No. 12/972,565 filed on Dec. 20, 2010.

BACKGROUND

1. Technical Field

Embodiments of the present invention relate to a database technique, and more particularly to an information processor, an information processing system, a data archiving method, and a data deletion method which enable efficient deletion of data from a database.

2. Discussion

Public offices and enterprises have large-scale database systems built therein for managing vast amounts of data generated in various kinds of activities. In such a large-scale database system, a huge amount of data is generated and stored every day, and therefore, it is operationally common that less important data in a predetermined range is archived on a regular or irregular basis and, further, the data that is no longer necessary is deleted from the database. When data on the order of tens of thousands of, hundreds of thousands of, or even millions of records is to be processed in the data deletion or archiving process, it takes some time to complete the processing, with a heavy load placed on the system.

In a database, various types of transaction isolation levels have been provided to improve a wait state occurring while a plurality of processes are performed concurrently. During the deletion or archiving process described above, the following malfunctions may occur depending on the transaction isolation levels.

Specifically, a low transaction isolation level may lead to a malfunction in which an application is able to refer to target data until the deletion process or the archiving process is completed. It is desirable that archived data is not referred to by any application except the application that is performing the archiving process from the start point of the archiving process, and it is also desirable that deleted data is not referred to by any application from the time point of deletion thereof. Furthermore, the fact that another application can refer to the archived target data will lead to degraded performance of that application when referring to data.

On the other hand, a high transaction isolation level may lead to a malfunction in which, when another application refers to data of the deletion target that is being deleted, the application may wait for unlocking, with no response, until the deletion process is completed. Further, in the archiving process, a deletion process is performed following the retrieval of data, causing the similar malfunction to occur during the deletion process. Furthermore, the retrieval of data for archiving also requires much time and imposes a heavy load, and thus, there also is a demand for an archiving method which does not impose a load on a production database.

Still further, in a database, for the need of lock control, the amount of memory usage increases in accordance with the number of target records. When the amount of memory used for the lock control reaches the greatest amount of memory usage that can be set, lock escalation takes place, which switches per-record locks to a full-table lock. With the full-table lock, data in the table other than the target data is locked as well. In this case, another application process may have to wait until the lock is released, in some transaction isolation levels, even in the case of referring to data other than the target data.

BRIEF SUMMARY

As described above, the conventional database technique is not sufficient because, when deleting or archiving a huge amount of data, it would cause the above-described problems until the end of the process. Embodiments may therefore include an information processing system, a data archiving method, and a data deletion method which ensure that a deletion target the deletion of which has actually been requested or a deletion target which is to be deleted in an archiving process is excluded from a target of data manipulation immediately after a command instructing immediate processing is received, irrespective of the transaction isolation level, and that, from an application that is not supposed to refer to the data being deleted, the deletion target is seen as if it were already deleted from a database, even before the completion of the deletion thereof.

Embodiments may also include an information processor for managing a database which, upon receipt of an immediate processing command having a deletion target to be deleted from the database conditioned therein, registers information defining the deletion target according to the immediate processing command (for example, a target table and a conditional expression defining a target area) into a management data unit. This deletion target registered in the management data unit is deregistered therefrom when the deletion target according to the immediate processing command has been deleted from the database. On the other hand, in the case where a data manipulation command (for example, an inquiry command or a normal deletion command) issued to the database is to be processed while the deletion target is registered in the management data unit, the management data unit is referred to and, in the case where a data manipulation command having a data manipulation target that coincides with the target table registered in the management data unit is received, the data manipulation command is processed after a condition to exclude the registered target area from the data manipulation target is added to the data manipulation command.

Further, in embodiments of the present invention, the process of deleting the deletion target may be executed in the state where the deletion target is not locked in units of records.

Further, in embodiments of the present invention, an environment variable may be provided which designates whether to lock the deletion target in units of area when performing the process of deleting the deletion target according to the immediate processing command. In the case where the deletion target is not locked in units of area, when the update or insert command has an update or insert target that coincides with the range of the deletion target that has been registered in the management data unit, an error may be returned in response to that command.

In the case where the deletion target is locked in units of area, when the update or insert target of the update or insert command coincides with the range of the deletion target that has been registered in the management data unit, the update or insert process may be executed after the deletion process according to the immediate processing command is finished and the per-area lock of the deletion target is released.

Further, in embodiments of the present invention, the immediate processing command may be an archive preparation command which conditions the deletion target that is to be retrieved for archiving and then deleted from the database. In this case, the process of deleting the deletion target according to the archive preparation command registered in the management data unit may be started in response to an archive deletion execution command instructing execution of the deletion of the intended deletion target.

Further, in embodiments of the present invention, the information may be registered in the management data unit by further associating thereto a requestor identifier (a requestor session identifier) of the client that issued the archive preparation command. In this case, it may be configured so as not to add the condition of excluding the deletion target from the manipulation target in the case where the deletion target has the same requestor as that of the data manipulation command. This enables a condition in which only the client refers to the area of the deletion target and archives the data in the deletion target area.

Further, in embodiments of the present invention, the immediate processing command may be an immediate deletion command which conditions the deletion target to be immediately deleted, and the process of deleting the deletion target according to the immediate deletion command may be started immediately after the deletion target is registered into the management data unit.

Further, in embodiments of the present invention, in the case where the management data unit has a deletion target already registered therein, the deletion target according to the immediate processing command may be set to a range that is obtained by excluding, from the deletion target conditioned by the immediate processing command, the target area in the same target table that has been registered in the management data unit.

Further, in embodiments of the present invention, the database which is managed may be a production database and its replication database, and a command issued to the production database may be relayed to the replication database. For relaying, in the case where an archive preparation command issued to the production database is received, a deletion target that is conditioned by the command and that is to be retrieved for archiving and then deleted from the database may be registered in an archive management data unit. Furthermore, in the case where an archive deletion execution command issued to the production database is received, an immediate deletion command for the deletion target that has been registered in the archive management data unit may be issued to the replication database and the deletion target may be deregistered from the archive management data unit.

Further, in embodiments of the present invention, in the case where a command related to the table that has been registered in the archive management data unit and in which the archiving process is in progress is received, the command may be stored in a queue (an archive-time command receive queue). In this case, after the archiving process is finished, once the deletion target is deregistered from the archive management data unit, any data manipulation command, among the queued commands, that is related to the table of the deregistered deletion target may be issued to the replication database.

At this time, on the replication database side, in the case where the immediate deletion command is received, a deletion target conditioned by the immediate deletion command may be registered into a deletion target management data unit and the deletion target may be deleted from the replication database, and the deletion target for which the deletion process has been completed may be deregistered from the deletion target management data unit. On the other hand, in the case where a data manipulation command having a data manipulation target that coincides with the target table registered in the deletion target management data unit is received, the process for the data manipulation command may be executed in the state where a condition to exclude the registered target area from the data manipulation target is added to the data manipulation command.

According to the above configuration, a deletion target requested by an immediate processing command, even if it is a huge amount of data, may be excluded from a target of data manipulation in a database immediately after the deletion target is registered into a management data unit. As a result, the deletion target is seen as if it were already deleted, at least from an application that should not refer to the data being deleted, even if the deletion process has not been completed yet. As for a data manipulation command such as an inquiry command, the processing according to the command is executed in the state where a condition to exclude the deletion target from the manipulation target is added to that command. This prevents the data of the deletion target from being referred to, and accordingly, avoids the undesirable event that the data that is to be deleted and thus should not exist is included in the result of inquiry, or that the process waits for unlocking of the deletion target area when referring to data.

Further, at this time, the condition designating the manipulation target of the data manipulation command is modified in such a manner that the deletion target is excluded from the manipulation target during the processing according to the data manipulation command. For such a data manipulation command, lock control is unnecessary. It is thus possible to reduce the amount of memory usage and avoid occurrence of lock escalation.

Embodiments may include computer program product for managing a database, wherein the computer program product has a computer readable storage medium with computer readable program code embodied therewith. The computer readable program code may include command receiving unit program code configured to receive an immediate processing command having a deletion target to be deleted from the database conditioned therein. The computer readable program code may also include registration processing unit program code configured to register information defining the deletion target according to the immediate processing command into a management data unit. In addition, the computer readable program code may include deletion processing unit program code configured to delete the deletion target according to the immediate processing command from the database, and deregister the deletion target the deletion of which has been completed from the management data unit. The computer readable program code can also include data manipulation command processing unit program code configured to, in the case where a data manipulation command is received which has a manipulation target that coincides with a table of the deletion target that has been registered in the management data unit, process the data manipulation command in a state where a condition to exclude the deletion target from the manipulation target is added to the data manipulation command.

Other embodiments may include a computer program product for managing a production database and a replication database replicated from the production database by a plurality of computers, wherein the computer program product has a computer readable storage medium with computer readable program embodied therewith. The computer readable program code can include command relay unit program code configured to receive a command issued to the production database and transferring the command to the replication database, wherein upon receipt of an archive preparation command which conditions a deletion target that is to be retrieved for archiving and then deleted from the production database and the replication database, the command relay unit program code registers information defining the deletion target into an archive management data unit. In addition, upon receipt of a data manipulation command which is related to a table of the deletion target that has been registered in the archive management data unit, the command relay unit program code may queues the data manipulation command. Upon receipt of an archive deletion execution command instructing execution of the deletion of the intended deletion target, the command relay unit program code may also issue to the replication database an immediate deletion command for the deletion target that has been registered in the archive management data unit and deregisters the deletion target from the archive management data unit, and the command relay unit program code may further issue to the replication database any of the queued data manipulation commands that is related to the table of the deregistered deletion target. The computer program product can also include the replication database, wherein the replication database includes registration processing unit program code, upon receipt of the immediate deletion command, configured to register information defining a deletion target conditioned by the immediate deletion command into a deletion target management data unit. The replication database may also include deletion processing unit program code configured to delete the deletion target according to the immediate deletion command from the replication database and deregister the deletion target the deletion of which has been completed from the deletion target management data unit. Additionally, the replication database can include data manipulation command processing unit program code, upon receipt of a data manipulation command that has a manipulation target that coincides with a table of the deletion target that has been registered in the deletion target management data unit, configured to process the data manipulation command in a state where a condition to exclude the deletion target from the manipulation target is added to the data manipulation command.

Embodiments may also involve a method, performed by a computer, for archiving data stored in a database, the method including receiving an archive preparation command which conditions a deletion target that is to be retrieved for archiving and then deleted from the database. The method may also provide for registering information defining the deletion target according to the archive preparation command into a management data unit. In the case where a data manipulation command having a manipulation target that coincides with a table of the deletion target that has been registered in the management data unit is received, the method can involve processing the data manipulation command in a state where a condition to exclude the deletion target from the manipulation target is added to the data manipulation command. In response to an archive deletion execution command, the method may include reading from the management data unit the intended deletion target registered therein and starting the process of deleting the intended deletion target from the database. In response to the completion of the deletion process, the method can include deregistering from the management data unit the deletion target the deletion of which has been completed.

In addition, embodiments may include a method, performed by a computer, for deleting data from a database. The method can involve receiving an immediate deletion command having a deletion target to be immediately deleted from the database conditioned therein, and registering information defining the deletion target according to the immediate deletion command into a management data unit. The method may also include starting a process of deleting the deletion target according to the immediate deletion command from the database. In the case where a data manipulation command is received which has a manipulation target that coincides with a table of the deletion target that has been registered in the management data unit, the method can include processing the data manipulation command in the state where a condition to exclude the deletion target from the manipulation target is added to the data manipulation command. In response to the completion of the deletion process, the method may involve deregistering from the management data unit the deletion target the deletion of which has been completed.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 4A illustrates a data structure of a table in the database, FIG. 4B illustrates a data structure of an immediate deletion table, and FIG. 4C illustrates a data definition of an immediate deletion lock variable, each shown by way of example;

DETAILED DESCRIPTION

Hereinafter, the present invention will be described with reference to embodiments, although the present invention is not restricted to the embodiments. In the following embodiments, a database system (hereinafter, referred to as a "DB system"), which includes a database server (hereinafter, referred to as a "DB server") as an information processor that manages a database, will be described as an example of an information processing system.

First Embodiment

Figure 1:
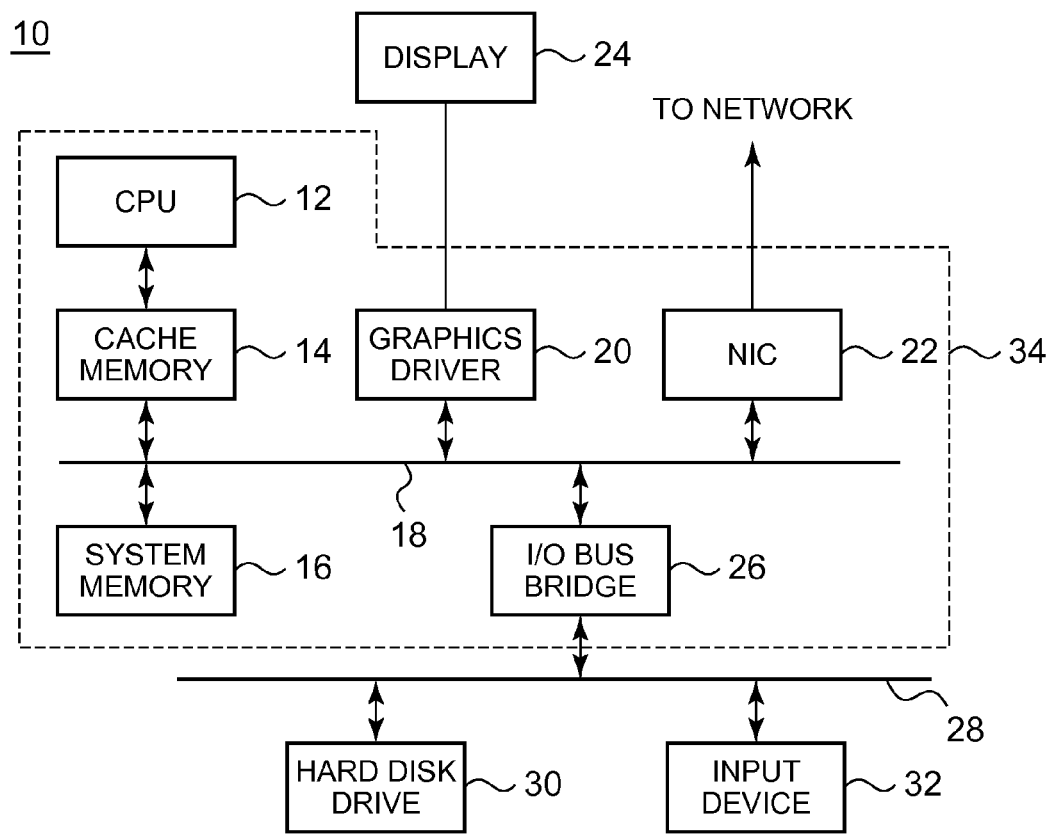
FIG. 1 is a diagram showing an example of an embodiment of a hardware configuration of a database server.

Firstly, hardware and software configurations of a DB server 10 constituting a DB system according to a first embodiment will be described. FIG. 1 shows an embodiment of a hardware configuration of the DB server 10. The DB server 10 shown in FIG. 1 is generally configured as a computer device 34 such as a personal computer, a workstation, or a mainframe computer. The computer device 34 shown in FIG. 1 includes a central processing unit (CPU) 12, a cache memory 14 which enables the CPU 12 to perform fast access to the data used thereby, and a system memory 16 which is made up of a solid-state memory element, such as a DRAM, that enables the CPU 12 to perform processing.

The CPU 12, the cache memory 14, and the system memory 16 are connected via a system bus 18 to other devices or drivers, including a graphics driver 20 and a network interface card (NIC) 22. The graphics driver 20 is connected via a bus to an external display 24, so as to display a result of processing by the CPU 12 on a display screen. The NIC 22 connects the DB server 10 to a network which uses an appropriate communication protocol such as TCP/IP, the connection being made in the physical layer level and the data link layer level.

An I/O bus bridge 26 is also connected to the system bus 18. On the downstream side of the I/O bus bridge 26, a hard disk drive 30 is connected via an I/O bus 28, with serial ATA, USB or the like. The hard disk drive 30 provides a storage area which stores data in a database according to the present embodiment. Furthermore, an input device 32, which may be a pointing device such as a keyboard and a mouse, is connected to the I/O bus 28 via a bus such as a USB. This input device 32 provides a user interface. An operator is able to instruct database maintenance and other processing operations to the computer device 34 by using the input device 32 or by remote access via the NIC 22.

For the CPU 12 of the computer device 34, any single-core processor or multi-core processor may be used. The DB server 10 is controlled by an operating system (hereinafter, referred to as an "OS") such as Windows (registered trademark) 200X, UNIX (registered trademark), LINUX (registered trademark), or the like. Further, the DB server 10 implements a database management system (DBMS) which manages a database such as a relational database, an object relational database, an extensible markup language (XML) database, or the like. It is noted that a client can also be implemented with a hardware configuration similar to that shown in FIG. 1.

Figure 2:
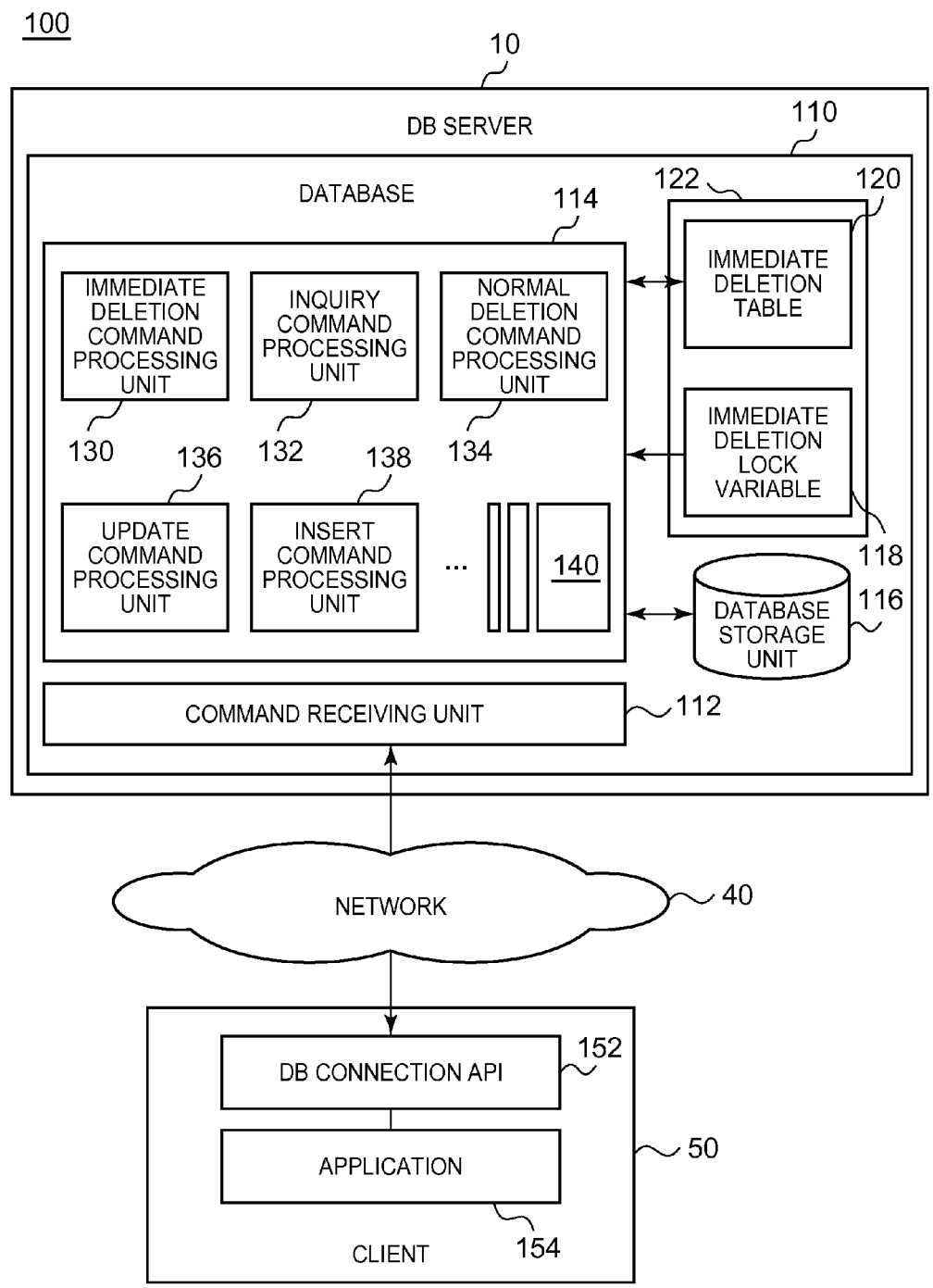
FIG. 2 shows functional blocks of an example of a database system implemented on the database server and a client according to a first embodiment.

FIG. 2 shows functional blocks of a DB system 100 implemented on the DB server 10 and a client 50 according to the first embodiment. The DB server 10 and the client 50 communicate with each other via a network 40 such as a local area network (LAN), in accordance with the Ethernet (registered trademark) and a communication protocol such as TCP/IP.

A database 110, which operates on the DB server 10, includes a command receiving unit 112, which receives various commands from the client 50 and the like via a database connection, a command processing group 114 which performs processing in accordance with various commands received, and a database storage unit 116, which stores data included in the database 110. The database 110 uses a database language such as SQL. The database 110 executes transaction processing with the client 50 according to atomicity, consistency, isolation, and durability (ACID) properties. Furthermore, the database 110 provides the client 50 with access to the data stored in the database storage unit 116. While the case of using a relational database will be described in the embodiment for the sake of convenience, embodiments of the present invention are not restricted thereto.

The command receiving unit 112 is implemented on a computer as a command receiving unit according to the embodiment of the present invention, together with the hardware resources including the NIC 22 shown in FIG. 1. The database storage unit 116, which is provided by the hard disk drive 30 shown in FIG. 1, stores the data in a computer-accessible format.

The command processing group 114 includes an immediate deletion command processing unit 130 which processes an immediate deletion command (which will be described later in detail) according to the present embodiment. The command processing group 114 further includes an inquiry command processing unit 132, a normal deletion command processing unit 134, an update command processing unit 136, and an insert command processing unit 138, which process an inquiry command (SELECT statement), a normal deletion command (DELETE statement; which is referred to as "normal deletion" so as to be distinguished from "immediate deletion"), an update command (UPDATE statement), and an insert command (INSERT statement), respectively. In addition, the command processing group 114 in the database 110 includes command processing units 140, which process various commands for data definition, data manipulation, and data control, typically provided for in a database language.

The database 110 of the present embodiment further includes an immediate deletion lock variable 118, which indicates whether a deletion target area is locked or unlocked in a target table during processing of an immediate deletion command, and an immediate deletion table 120 in which a deletion target that is conditioned by an immediate deletion command is registered for management. The immediate deletion lock variable 118 and the immediate deletion table 120 are stored in a management data unit 122 provided by the storage area of the system memory 16 or the hard disk drive 30. The immediate deletion lock variable 118 and the immediate deletion table 120 are referred to by the command processing units 130 to 140. While the management data unit 122 described herein stores data in a table structure of the immediate deletion table 120, the data structure for registering and managing the deletion target is not particularly restricted.

In the client 50, for remote access to the database 110 in the DB server 10, a database connection application programming interface (hereinafter, referred to as a "DB connection API") 152 is implemented, which is configured as a common application programming interface (API) such as Java database connectivity (JDBC) or open database connectivity (ODBC), or as another DBMS-specific API, allowing the client 50 to access the database 110. An application 154 which is executed on the client 50 and which needs to use the data in the database 110 accesses the database 110 via this API 152.

The application 154 uses the DB connection API 152 to establish a database connection with the database 110 in the DB server 10, and issues various kinds of commands described in a database language such as SQL. The commands include an immediate deletion command (DELETE IMMEDIATE statement) according to the present embodiment, and also include a data manipulation command such as an inquiry command (SELECT statement). Returning to the description of the DB server 10, the database 110 uses the command processing units 130 to 140 in the command processing group 114 to interpret each command issued by the application 154 and execute required processing, and returns the processing result to the client 50.

The immediate deletion command (DELETE IMMEDIATE statement) according to the present embodiment is an immediate processing command for conditioning a deletion target and for deleting the deletion target from the database while immediately excluding the deletion target from a target of data manipulation (SELECT statement, DELETE statement, or the like). In the case where a deletion target consists of a huge number of records, the deletion process may take some time to complete. Thus, in the present embodiment, this immediate deletion command is introduced so as to allow the deletion target according to the immediate deletion command to be excluded from a target of data manipulation according to another data manipulation command, even in the state where the actual deletion process has not been completed yet.

When an immediate deletion command is issued to the database 110, the immediate deletion command processing unit 130 registers a deletion target conditioned by that command into the immediate deletion table 120, and then starts deleting the deletion target in accordance with the value of the immediate deletion lock variable 118. The deletion target is specified by a table name which identifies a target table, and a conditional expression which designates a target area within the target table. The target table name and the conditional expression defining the target area are written into the immediate deletion table 120 for management.

The deletion process according to the immediate deletion command is performed in the state where deletion target records are not locked, irrespective of the transaction isolation level. Once the deletion process has been completed, the excluding process using the immediate deletion table 120 becomes unnecessary, and therefore, the immediate deletion command processing unit 130 deregisters the deletion target according to the immediate deletion command from the immediate deletion table 120.

The remaining command processing units 132, 134, 136, 138 in the command processing group 114 each refer to the immediate deletion table 120 when processing the corresponding command. The inquiry command and the normal deletion command each only refer to or erase a target record; no information is newly added to the position where the processing has been completed. Thus, in the present embodiment, the inquiry command processing unit 132 and the normal deletion command processing unit 134 are each configured to process the inquiry or normal deletion command after modifying the command by adding thereto a condition to exclude the deletion target that has been registered in the immediate deletion table 120 from the target of inquiry or normal deletion, so as not to touch that deletion target during the processing of the inquiry or normal deletion command.

On the other hand, the insert command is a command for inserting a new record; new information is added to the position where the processing has been completed. Thus, in the present embodiment, in the case where the insert target of the command coincides with the deletion target that has been registered in the immediate deletion table 120, the insert command processing unit 138 determines whether it is possible to execute the command, in accordance with the value of the immediate deletion lock variable 118, and returns an error if it is not possible to execute the command.

The update command is a command for rewriting the record satisfying a certain condition with new information. Thus, in the present embodiment, the update command processing unit 136 is configured to process the update command after modifying the command by adding thereto a condition to exclude the deletion target that has been registered in the immediate deletion table 120 from the target of update, so as not to touch that deletion target during the processing of the update command. Furthermore, in the case where the value updated according to the command coincides with the deletion target that has been registered in the immediate deletion table 120, the update command processing unit 136 determines whether it is possible to execute the command, in accordance with the value of the immediate deletion lock variable 118, and returns an error if it is not possible to execute the command.

The functional units in the DB server 10 shown in FIG. 2 are implemented on the DB server 10 as a program that is deployed on the system memory 16 in the DB server 10 and executed by the CPU 12 to control the operations of the hardware resources. The immediate deletion command processing unit 130 is implemented on the computer as a registration processing unit and a deletion processing unit according to the present embodiment. Further, the inquiry command processing unit 132 or the normal deletion command processing unit 134 is implemented on the computer as a data manipulation command processing unit according to the present embodiment which processes an inquiry command or a normal deletion command as a data manipulation command. Still further, the update command processing unit 136 or the insert command processing unit 138 is implemented on the computer as an update or insert command processing unit according to the present embodiment.

The functional units in the client 50 are similarly implemented on the client 50 as a program that is deployed on the system memory or the like in the client 50 and executed by the CPU to control the operations of the hardware resources. Hereinafter, the functions of the immediate deletion command according to the present embodiment will be described in more detail.

(A) Immediate Deletion Command Processing Unit

Figure 3:
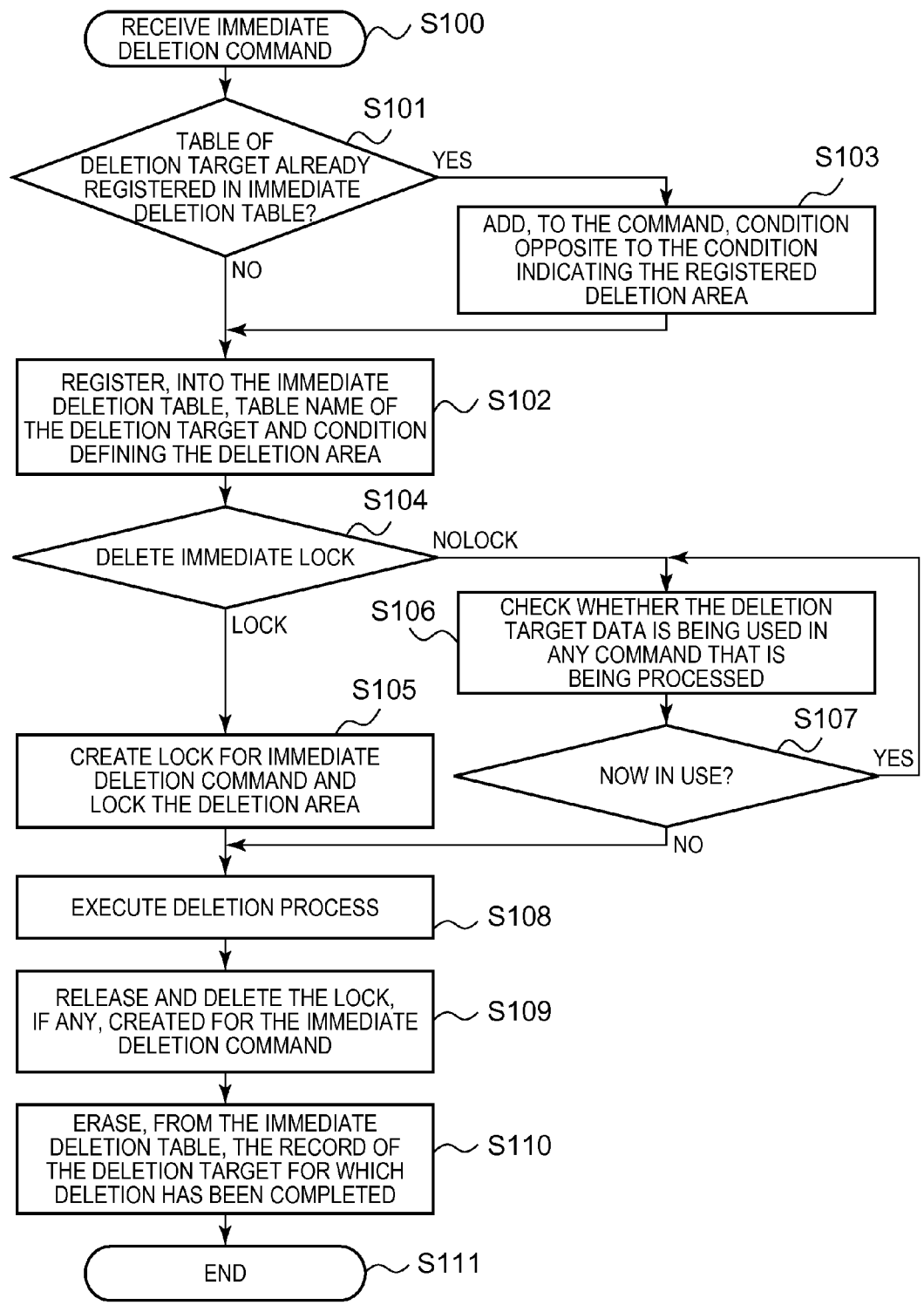
FIG. 3 is a flowchart illustrating an example of the processing performed by an immediate deletion command processing unit according to the first embodiment.

FIG. 3 is a flowchart illustrating the processing performed by the immediate deletion command processing unit 130 (FIG. 2) according to the first embodiment. FIG. 4A shows a data structure of a MSG table as a target of immediate deletion, which is exemplarily referred to for convenience of explanation. As shown in FIG. 4A, the MSG table includes "DATE", "LEVEL", and "MESSAGE" columns. Referring to FIG. 3, the process shown in FIG. 3 starts at step S100 in response to the event that the command receiving unit 112 receives an immediate deletion command.

In step S101, the immediate deletion command processing unit 130 interprets the received immediate deletion command to specify a target table and a target area to be deleted, and determines whether there is a record in the immediate deletion table 120 (FIG. 2) in which the matching target table name is specified. FIG. 4B shows, by way of example, a data structure of the immediate deletion table 120 according to the present embodiment. As shown in FIG. 4B, the immediate deletion table 120 includes a "TARGET TABLE NAME" column in which the name of the target table is written, a "TARGET AREA" column in which a conditional expression defining the deletion target area is written, and a "LOCK IDENTIFIER" column in which, when a lock is created for the deletion target area, a lock identifier for that lock is written.

If it is determined in step S101 that there is no record with the matching target table name in the immediate deletion table 120 (NO), the process proceeds to step S102. In step S102, the immediate deletion command processing unit 130 writes into the immediate deletion table 120 the target table name and the conditional expression for the target area, as shown in FIG. 4B for example, and the process proceeds to step S104.

In step S104, the immediate deletion command processing unit 130 refers to the immediate deletion lock variable 118 (FIG. 2), which is an environment variable, to determine whether the value is "NOLOCK" or "LOCK". FIG. 4C shows a data definition of the immediate deletion lock variable 118. If it is determined in step S104 that the value of the immediate deletion lock variable 118 is "LOCK", the process proceeds to step S105. In step S105, the immediate deletion command processing unit 130 creates a lock for the immediate deletion command so as to lock the deletion target in units of area, and writes a lock identifier for identifying the lock into the immediate deletion table 120. Then, in step S108, the immediate deletion command processing unit 130 starts the deletion process of the target area in the target table.

On the other hand, if it is determined in step S104 that the value of the immediate deletion lock variable 118 is "NOLOCK", the process proceeds to step S106. In step S106, the immediate deletion command processing unit 130 checks whether the deletion target record is being used by any command that had been issued prior to the immediate deletion command and that is now being processed, and determines whether it is now in use or not in step S107. If it is determined in step S107 that the deletion target record is now in use (YES), the process loops back to step S106 until it is confirmed that the record is not in use.

More specifically, in step S106 described above, the immediate deletion command processing unit 130 searches the storage area where all the commands that are being processed are stored, for any command that had been issued prior to the issuance of the immediate deletion command and that is now being processed. The immediate deletion command processing unit 130 then checks whether the retrieved commands include any command that is using the deletion target area of the immediate deletion command, and if there is any such command, the immediate deletion command processing unit 130 waits until the processing according to that command is finished. As for a data manipulation command that is issued after the deletion target of the immediate deletion command has been written into the immediate deletion table 120, the deletion target is excluded and untouched by the processing according to the data manipulation command. In contrast, as for a data manipulation command that had been issued prior to the issuance of the immediate deletion command, it may be necessary to wait until the processing according to that data manipulation command is completed. This is why such a command that had been issued prior to the immediate deletion command and that is being processed is checked. If it is determined in step S107 that the deletion target record is not in use (NO), the process proceeds to step S108, where the deletion process of the target area in the target table is started.

When the deletion process is complete, in step S109, the immediate deletion command processing unit 130 releases and deletes any lock that had been created for the immediate deletion command, and in step S110, the immediate deletion command processing unit 130 erases the record of the deletion target registered in the immediate deletion table 120. In step S111, the immediate deletion command processing unit 130 finishes the processing regarding the immediate deletion command.

Referring again to step S101, if it is determined in step S101 that there is a record with the same target table name as that of the command (YES), the process proceeds to step S103. In step S103, the immediate deletion command processing unit 130 adds, to the condition indicating the deletion target of the received immediate deletion command, a condition opposite to the condition indicating the target area specified in the record that has been registered in the immediate deletion table 120 and that has the matching table name specified therein. In step S102, the immediate deletion command processing unit 130 writes the target table name and the conditional expression for the target area into the immediate deletion table 120, before the process proceeds to step S104 and on.

In this case, if it is determined that the value of the immediate deletion lock variable 118 is "LOCK", in step S105, the immediate deletion command processing unit 130 creates a lock for the immediate deletion command so as to lock the deletion target, and writes a lock identifier for identifying the lock into the immediate deletion table 120. Then, the process of deleting the corresponding range is started in step S108. On the other hand, if it is determined that the value of the immediate deletion lock variable 118 is "NOLOCK", the process of deleting the range excluding the deletion target area that has been registered is started in step S108.

Figure 5:
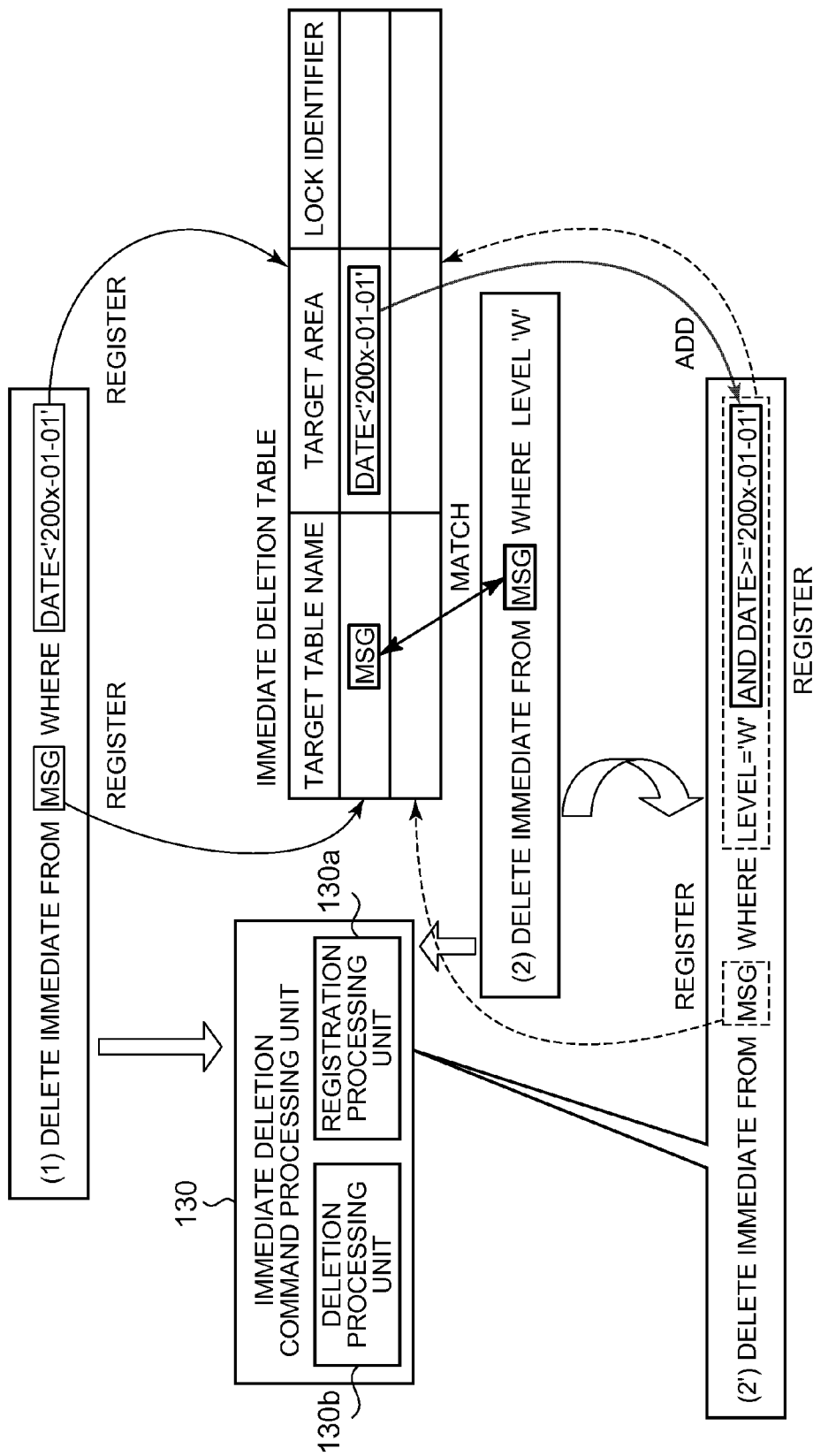
FIG. 5 schematically illustrates an example of the processing operations performed in the case where a plurality of immediate deletion commands are issued in an overlapping manner.

FIG. 5 schematically illustrates the processing operations performed in the case where a plurality of immediate deletion commands are issued in an overlapping manner. It is noted that FIG. 5 shows more detailed functional blocks of the immediate deletion command processing unit 130, which are a registration processing unit 130a and a deletion processing unit 130b. The registration processing unit 130a is responsible for the processing in steps S101 to S107 in FIG. 3, while the deletion processing unit 130b is responsible for the deletion processing in steps S108 to S110 in FIG. 3.

As shown in FIG. 5, when a first immediate deletion command (DELETE IMMEDIATE statement) is issued, in step S102 shown in FIG. 3, the registration processing unit 130a writes a target table name "MSG" and a conditional expression defining the target area "DATE<'200x-01-01'" included in the first immediate deletion command into the immediate deletion table 120. Then, in step S108, the deletion processing unit 130b starts the deletion process of the target area "DATE<'200x-01-01'" in the target table "MSG" specified in the first immediate deletion command.

In the case where a second immediate deletion command (DELETE IMMEDIATE statement) targeting the same table is issued before the deletion process according to the first immediate deletion command is completed, in step S101 shown in FIG. 3, the registration processing unit 130a finds, from within the immediate deletion table 120, the record that has specified therein the same target table name "MSG" as that in the second immediate deletion command. In step S103, the registration processing unit 130a adds, to the condition "LEVEL='W'" indicating the deletion target according to the second immediate deletion command, a condition (for example, "DATE>='200x-01-01'") opposite to the condition indicating the target area specified in the record that has been registered in the immediate deletion table 120 and that has the matching table name specified therein, and in step S102, the registration processing unit 130a writes the target table name "MSG" and the conditional expression for the target area (for example, "LEVEL='W' AND DATE>='200x-01-01'") into the immediate deletion table 120.

Then, in step S108, the deletion processing unit 130b starts the deletion process of the target area (for example, "LEVEL='W' AND DATE>='200x-01-01'") in the target table "MSG" specified in the second immediate deletion command. As described above, the process flow according to the subsequent immediate deletion command is responsible for deleting the range excluding the target area of the preceding immediate deletion command in which the deletion process is being performed in accordance with that command.

(B) Inquiry Command Processing Unit and Normal Deletion Command Processing Unit

Figure 6A:
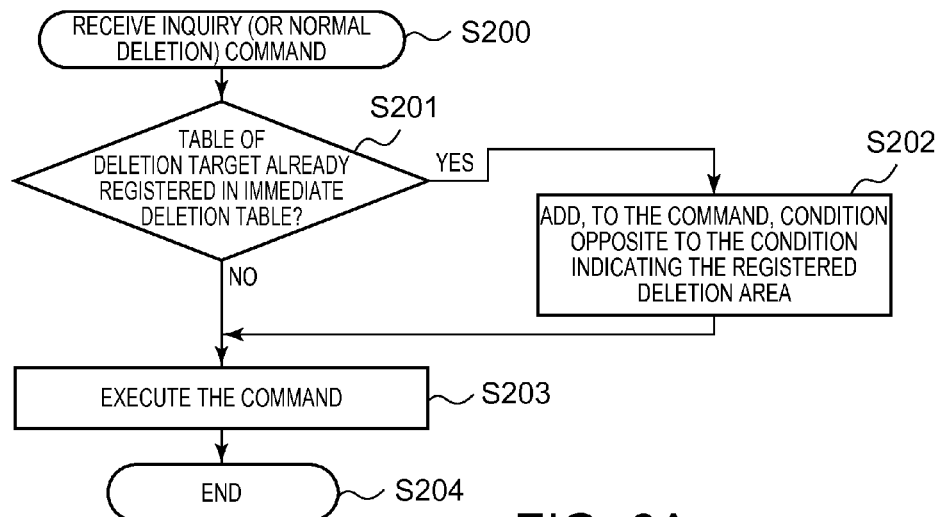
FIGS. 6A and 6B are flowcharts illustrating examples of the processing performed by an inquiry command processing unit and an update command processing unit, respectively, according to the first embodiment.

FIG. 6A is a flowchart illustrating the processing performed by the inquiry command processing unit 132 (FIG. 2) according to the first embodiment. It is noted that the processing performed by the normal deletion command processing unit 134 (FIG. 2) is similar to that of the inquiry command processing unit 132, and thus, for the processing of the normal deletion command, "inquiry command", "inquiry command processing unit 132", and "inquiry process" in the flowchart in FIG. 6A may be replaced with "normal deletion command", "normal deletion command processing unit 134", and "normal deletion process", respectively, as appropriate. The process shown in FIG. 6A starts at step S200 in response to the event that the command receiving unit 112 receives an inquiry command.

In step S201, the inquiry command processing unit 132 interprets the received inquiry command to specify a target table of the inquiry process, and then refers to the immediate deletion table 120 (FIG. 2) to determine whether there is a record in the immediate deletion table 120 in which the matching target table name is specified.

If it is determined in step S201 that there is no record with the matching target table name in the immediate deletion table 120 (NO), the process proceeds to step S203. In step S203, the inquiry command processing unit 132 executes the process according to the inquiry command, without adding any modification to the condition, and in step S204, the inquiry command processing unit 132 finishes the processing regarding the inquiry command.

On the other hand, if it is determined in step S201 that there is a record with the matching target table name in the immediate deletion table 120 (YES), the process proceeds to step S202. In step S202, the inquiry command processing unit 132 adds, to the received inquiry command, a condition opposite to the condition indicating the target area specified in the record that has been registered in the immediate deletion table 120 and that has the matching table name specified therein. In this case, in step S203, the inquiry command processing unit 132 executes the process of inquiring the range that is obtained by excluding from the target area conditioned by the inquiry command the deletion target area in the same target table that has been registered.

Figure 7:
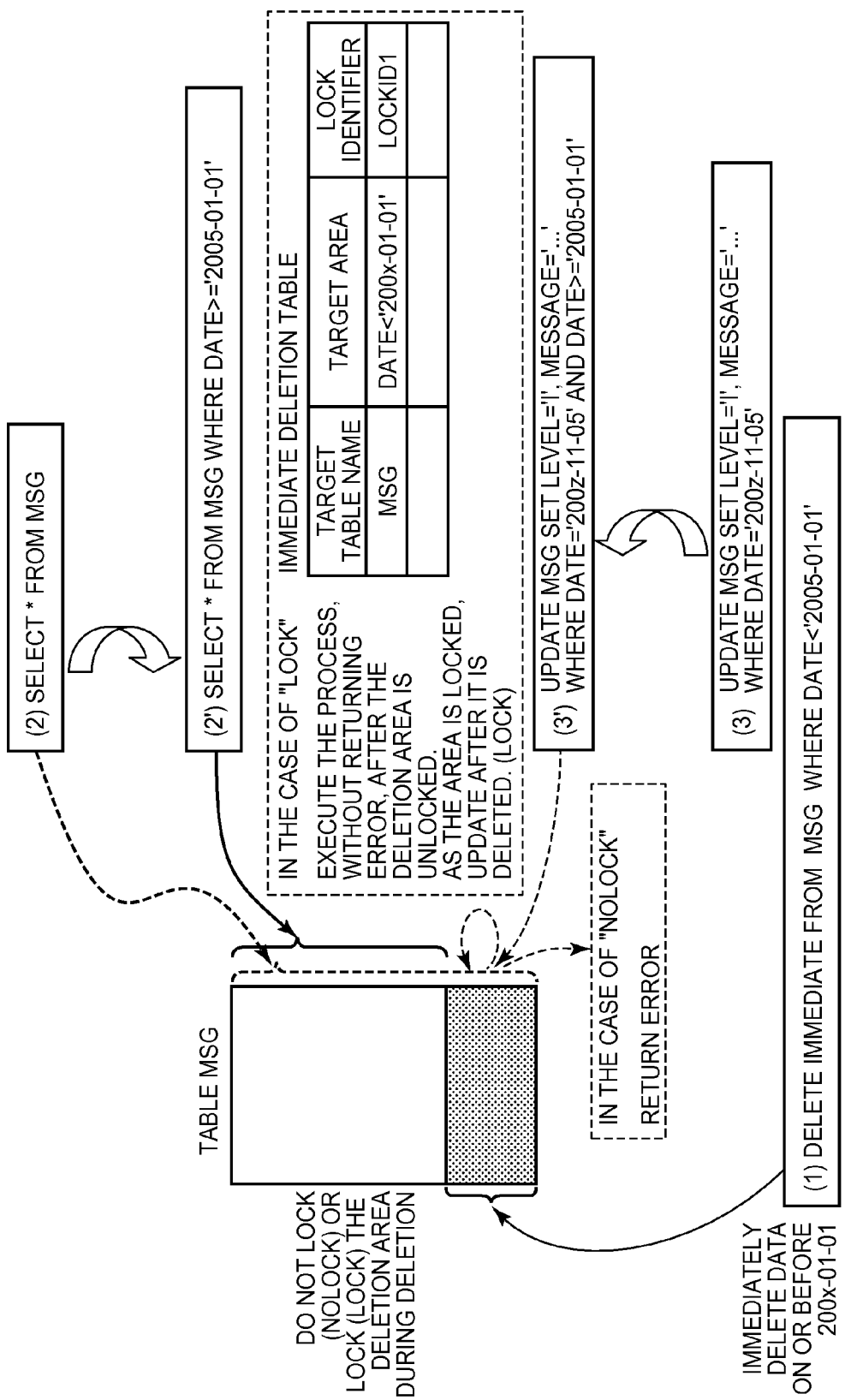
FIG. 7 schematically illustrates an example of the operations performed in the case where various kinds of commands are issued during the period from when an immediate deletion command was issued until when the deletion process therefor is completed.

FIG. 7 schematically illustrates the operations performed in the case where various kinds of commands are issued during the period from when an immediate deletion command was issued until when the deletion process is completed. As shown in FIG. 7, when an immediate deletion command is issued as a first command, the deletion process is started in the state where the deletion target area is locked or unlocked, depending on the value of the immediate deletion lock variable 118 (FIG. 2). In the case where an inquiry command is issued as a second command before completion of the deletion process, the processing according to the inquiry command is executed in the state where the inquiry command is modified such that a condition to exclude the deletion target of the first immediate deletion command is added thereto. As a result, even in the event that the entire table was inquired, only the range except the deletion target area is actually inquired, with the deletion target data remained untouched.

(C) Update Command Processing Unit and Insert Command Processing Unit

Figure 6B:
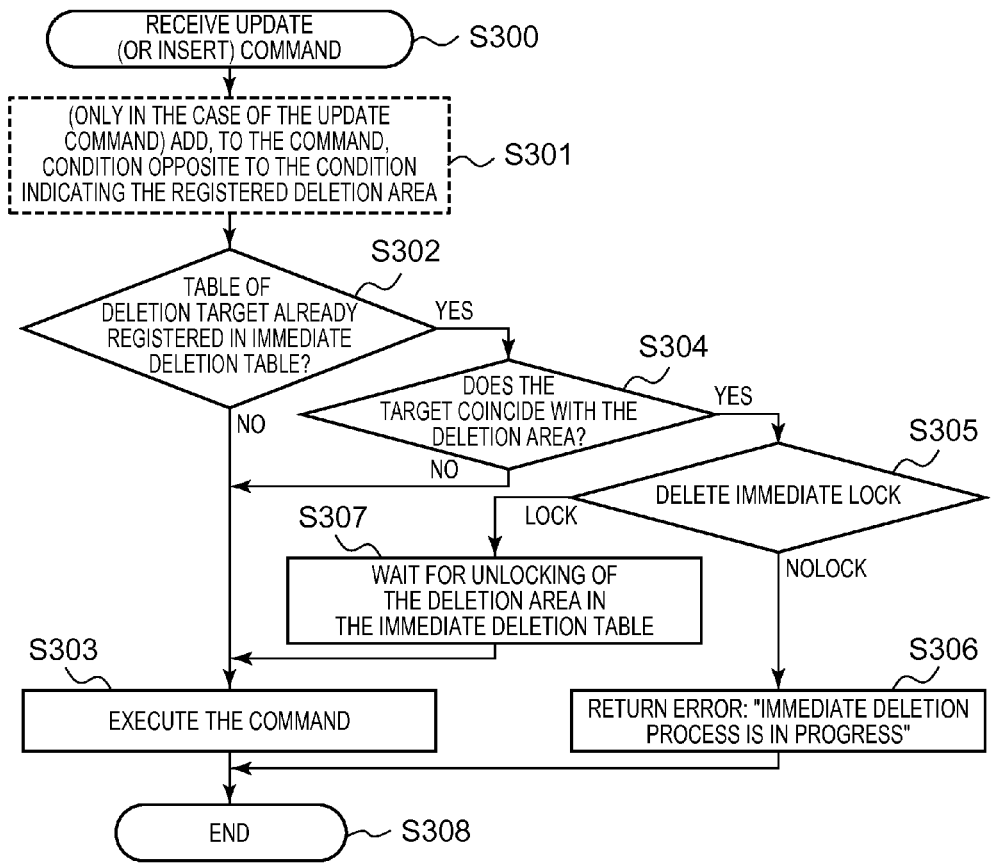

FIG. 6B is a flowchart illustrating the processing performed by the update command processing unit 136 (FIG. 2) according to the first embodiment. It is noted that the processing performed by the insert command processing unit 138 (FIG. 2) is approximately similar to that of the update command processing unit 136, and thus, it is described with reference to the same flowchart. In the flowchart, the process performed solely for the update command is shown in the dashed frame. Otherwise, "update command", "update command processing unit", and "update process" in the flowchart may be replaced with "insert command", "insert command processing unit", and "insert process", respectively, as appropriate. The process shown in FIG. 6B starts at step S300 in response to the event that the command receiving unit 112 receives an update command.

The process in step S301 is performed exclusively for the update command. In step S301, the update command processing unit 136 adds, to the update condition specified in the received update command, a condition opposite to the condition indicating the target area specified in the record that has been registered in the immediate deletion table 120 (FIG. 2) and that has the matching target table name specified therein, as in the above-described case of receiving the inquiry command or the normal deletion command. In the case of the insert command, the process proceeds directly from step S300 to step S302. In step S302, the update command processing unit 136 interprets the received update command to specify a target table of the update process, and refers to the immediate deletion table 120 to determine whether there is a record in the immediate deletion table 120 in which the matching target table name is specified. If it is determined in step S302 that there is no record with the matching target table name (NO), the process proceeds to step S303. In step S303, the update command processing unit 136 executes the process according to the update command, and in step S308, the update command processing unit 136 finishes the processing regarding the update command.

On the other hand, if it is determined in step S302 that there is a record with the matching target table name (YES), the process proceeds to step S304. In step S304, the update command processing unit 136 determines whether the target of the update process, i.e. the value updated according to the update process, coincides with the target area specified in the record that has been registered in the immediate deletion table 120 and that has the matching table name specified therein. In the case of the insert command, it is determined whether the target of the insert process, i.e. the data to be inserted, coincides with the target area. If it is determined in step S304 that the target does not coincide with the deletion target area (NO), the process proceeds to step S303, where the update command processing unit 136 executes the process according to the update command as usual, and finishes the processing regarding the update command in step S308.

On the other hand, if it is determined in step S304 that the target coincides with the deletion target area (YES), in step S305, the update command processing unit 136 refers to the immediate deletion lock variable 118 (FIG. 2) to determine whether the value is "NOLOCK" or "LOCK". If it is determined in step S305 that the value of the immediate deletion lock variable 118 is "LOCK", in step S307, the update command processing unit 136 waits for unlocking of the deletion target area in the immediate deletion table 120, before the process proceeds to step S303. In step S303, the update command processing unit 136 executes the process according to the update command as usual, and in step S308, the update command processing unit 136 finishes the processing regarding the update command.

On the other hand, if it is determined in step S305 that the value is "NOLOCK", the process proceeds to step S306. As the deletion target area is not locked, in step S306, the update command processing unit 136 returns an error indicating that the immediate deletion process is in progress, to the requestor that issued the update command, as a response to that update command. In step S308, the update command processing unit 136 terminates the processing regarding the update command.

FIG. 7 is referred to again. As shown in FIG. 7, in the case where an update command is issued before the deletion process according to the first command is completed, the update command is modified so as to be added with a condition to exclude the deletion target of the first immediate deletion command, before initiation of the process according to the update command. Furthermore, in the case where the update target coincides with the area of the deletion target that is being deleted, it is determined, according to whether the value of the immediate deletion lock variable 118 is LOCK or NOLOCK, to continue the process of the update command following the completion of the deletion process, without issuing an error (in the case of "LOCK"), or to return an error (in the case of "NOLOCK"). When the value of the immediate deletion lock variable 118 is "LOCK", the process according to the command is executed after the lock for the immediate deletion command that has been created for the deletion target is released. In the case where an insert command is issued, if the insert target coincides with the area of the deletion target that is being deleted, it is determined, according to whether the value of the immediate deletion lock variable 118 is LOCK or UNLOCK, to continue the process of the insert command, without issuing an error, following the completion of the deletion process (in the case of "LOCK"), or to return an error (in the case of "NOLOCK").

According to the immediate deletion command described above, a deletion target designated by the immediate deletion command, even if it is a huge amount of data, is excluded from a target of data manipulation immediately after the deletion target is registered in the immediate deletion table 120. This causes the deletion target to be seen from an application as if it were already deleted, even if the deletion process has not been completed yet. The processing for an inquiry command or the like is carried out with the deletion target excluded from the processing target. This prevents the deletion target data from being referred to and, hence, avoids the undesirable event that the data that is to be deleted and thus should not exist is included in the result of inquiry, or that the process waits for unlocking of the deletion target area when referring to data.

Further, in order for the deletion target to be excluded from the processing target of an inquiry command or the like, the condition designating the processing target of that command is modified. Moreover, whether the value of the immediate deletion lock variable 118 is "NOLOCK" or "LOCK", per-record lock control in the target table is unnecessary. This reduces the amount of memory usage, and can prevent occurrence of lock escalation.

Furthermore, introduction of the immediate deletion lock variable 118 allows the insert or update command to be processed in accordance with the operating guideline of the system. The immediate deletion lock variable 118 has been provided to address the situation where data is inserted or updated in a deletion target area even while the deletion process is in progress. Generally, however, there may only be a small practical demand to insert new data to or update the data in the area to be deleted. Therefore, the immediate deletion lock variable 118 can be set to a default value of "NOLOCK". Setting the immediate deletion lock variable 118 as "NOLOCK" may further eliminate the need of per-area lock control in the deletion target, leading to a further reduction in amount of the memory usage.

Second Embodiment

The above-described immediate deletion command according to the first embodiment is an immediate processing command for deleting a deletion target conditioned by the command from a database, while immediately excluding the deletion target from a target of data manipulation. In the following, a DB system according to a second embodiment will be described which is adapted to an archiving process of retrieving and then deleting data from a database at a predetermined point in time. It is noted that the DB system of the second embodiment is similar in hardware and software configurations to that of the first embodiment, and thus, differences therebetween will primarily be described below. The elements which exert functions similar to those of the first embodiment will be denoted by the same symbols with ['] added.

Figure 8:
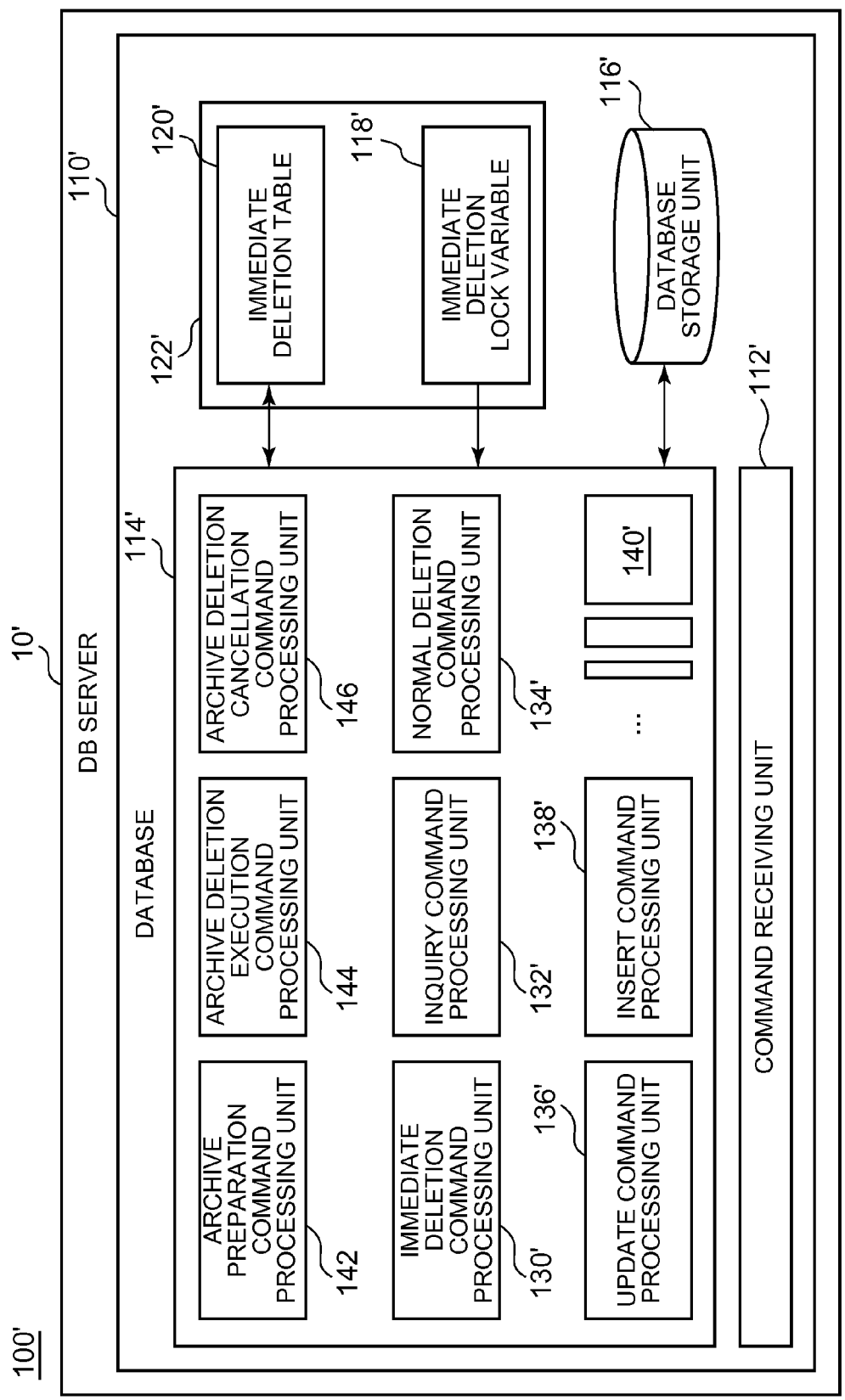
FIG. 8 is a functional block diagram of an example of a database system according to a second embodiment.

FIG. 8 shows functional blocks implemented on a DB server 10' in a DB system 100' according to the second embodiment. A database 110' operating on the DB server 10' of the present embodiment includes a command processing group 114', which includes command processing units 130' to 140' described above in the first embodiment, and further includes command processing units 142, 144, 146 related to an archiving process.

An archive preparation command processing unit (hereinafter, simply referred to as the "preparation command processing unit") 142, an archive deletion execution command processing unit (hereinafter, simply referred to as the "deletion execution command processing unit") 144, and an archive deletion cancellation command processing unit (hereinafter, simply referred to as the "deletion cancellation command processing unit") 146 are functional units which process an archive preparation command (ARCHIVE PREPARE statement), an archive deletion execution command (ARCHIVE EXEC DELETE statement), and an archive deletion cancellation command (ARCHIVE CANCEL DELETE statement), respectively, of the present embodiment.

The database 110' of the present embodiment includes a management database unit 122' which stores an immediate deletion lock variable 118' and an immediate deletion table 120', as in the first embodiment. The management data unit 122' is referred to by the command processing units 130' to 146 in the command processing group 114'.

An archive preparation command (hereinafter, simply referred to as the "preparation command") according to the present embodiment is an immediate processing command for conditioning a deletion target that is to be deleted after data retrieval in the archiving process and for immediately excluding the deletion target from a target of data manipulation according to another application. With this command, the deletion target intended to be deleted becomes unseen or unrecognizable from any application other than an application that issued or requested the preparation command, while the application as the requestor of the preparation command is capable of manipulating the data of the deletion target if necessary.

On the other hand, an archive deletion execution command (hereinafter, simply referred to as the "deletion execution command") according to the present embodiment is a command for instructing actual deletion of the intended deletion target when the data retrieval has been completed after the issuance of the preparation command. It is noted that two or more preparation commands may be issued prior to the issuance of a deletion execution command, in which case a single deletion execution command causes all the deletion targets conditioned by the preparation commands issued from the same requestor till then to be deleted altogether.

An archive deletion cancellation command (hereinafter, simply referred to as the "deletion cancellation command") according to the present embodiment is a command for cancelling deletion of the intended deletion target after the issuance of the preparation command, in the case where there arises a need to cancel the archiving process, for example in the event that an error has occurred during the archiving process.

An application for the archiving process which operates on the client of the present embodiment is capable of efficiently archiving the data within the database by issuing these archive-related commands to the database. When a preparation command is issued to the database 110', the preparation command processing unit 142 registers the deletion target conditioned by the command into the immediate deletion table 120', to make the deletion target inaccessible by another application. Furthermore, in the case where the value of the immediate deletion lock variable 118' is "LOCK", the preparation command processing unit 142 creates a lock for the immediate deletion command so as to lock the deletion target in units of area.

After the issuance of the preparation command, when data is retrieved properly and a deletion execution command is issued from the application to the database 110', then the deletion execution command processing unit 144 starts the actual deletion process of the deletion target bound to the requestor application. The deletion process of the deletion target is performed in the state where the deletion target records are not locked, irrespective of the value of the immediate deletion lock variable 118' and irrespective of the transaction isolation level. When the deletion process has been completed, the deletion execution command processing unit 144 deregisters from the immediate deletion table 120' the deletion target the deletion of which has been completed.

On the other hand, after the issuance of the preparation command, when a deletion cancellation command is issued from the application to the database 110', the deletion cancellation command processing unit 146 deregisters from the immediate deletion table 120' the deletion target bound to the requestor application.

The remaining command processing units 130', 132', 134', 136', 138' in the command processing group 114' execute the processing according to the corresponding commands by referring to the immediate deletion table 120', as in the first embodiment. The inquiry command processing unit 132' and the normal deletion command processing unit 134' are each configured to process the inquiry or normal deletion command after modifying the command by adding thereto a condition to exclude from the target of inquiry or normal deletion the deletion target that has been registered in the immediate deletion table 120' and that is bound to a requestor other than that of the inquiry or normal deletion command, so as not to touch that deletion target during the processing of the inquiry or normal deletion command.

On the other hand, the update command processing unit 136' and the insert command processing unit 138' are each configured, in the case where the update target or the insert target coincides with the deletion target that has been registered in the immediate deletion table 120' and that is bound to a requestor other than that of the update or insert command, to determine whether it is possible to execute the update or insert command, in accordance with the value of the immediate deletion lock variable 118', and return an error if it is not possible to execute the command.

The preparation command processing unit 142 is implemented on a computer as a registration processing unit of the present embodiment, and the deletion execution command processing unit 144 is implemented on a computer as a deletion processing unit of the present embodiment. Hereinafter, the functions of the archive-related commands of the present embodiment will be described in more detail.

(A) Archive Preparation Command Processing Unit

Figure 9:
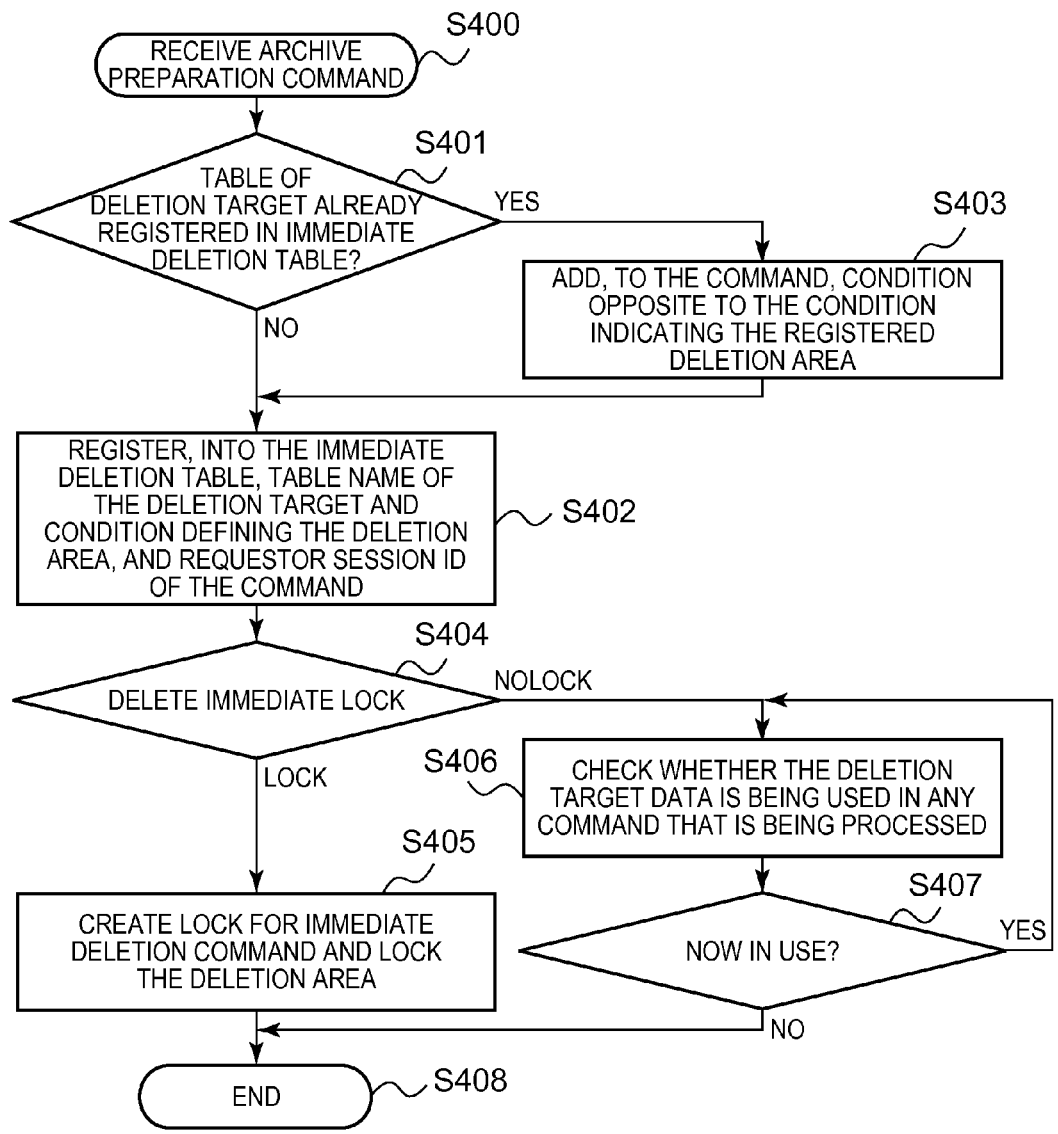
FIG. 9 is a flowchart illustrating an example of the processing performed by a preparation command processing unit according to the second embodiment.

FIG. 9 is a flowchart illustrating the processing performed by the preparation command processing unit 142 (FIG. 8) according to the second embodiment. The process shown in FIG. 9 starts at step S400 in response to the event that the command receiving unit 112' (FIG. 8) receives a preparation command. In step S401, the preparation command processing unit 142 interprets the received preparation command to specify a target table and a target area to be deleted, and determines whether there is a record in the immediate deletion table 120' (FIG. 8) in which the matching target table name is specified.

Figure 11:
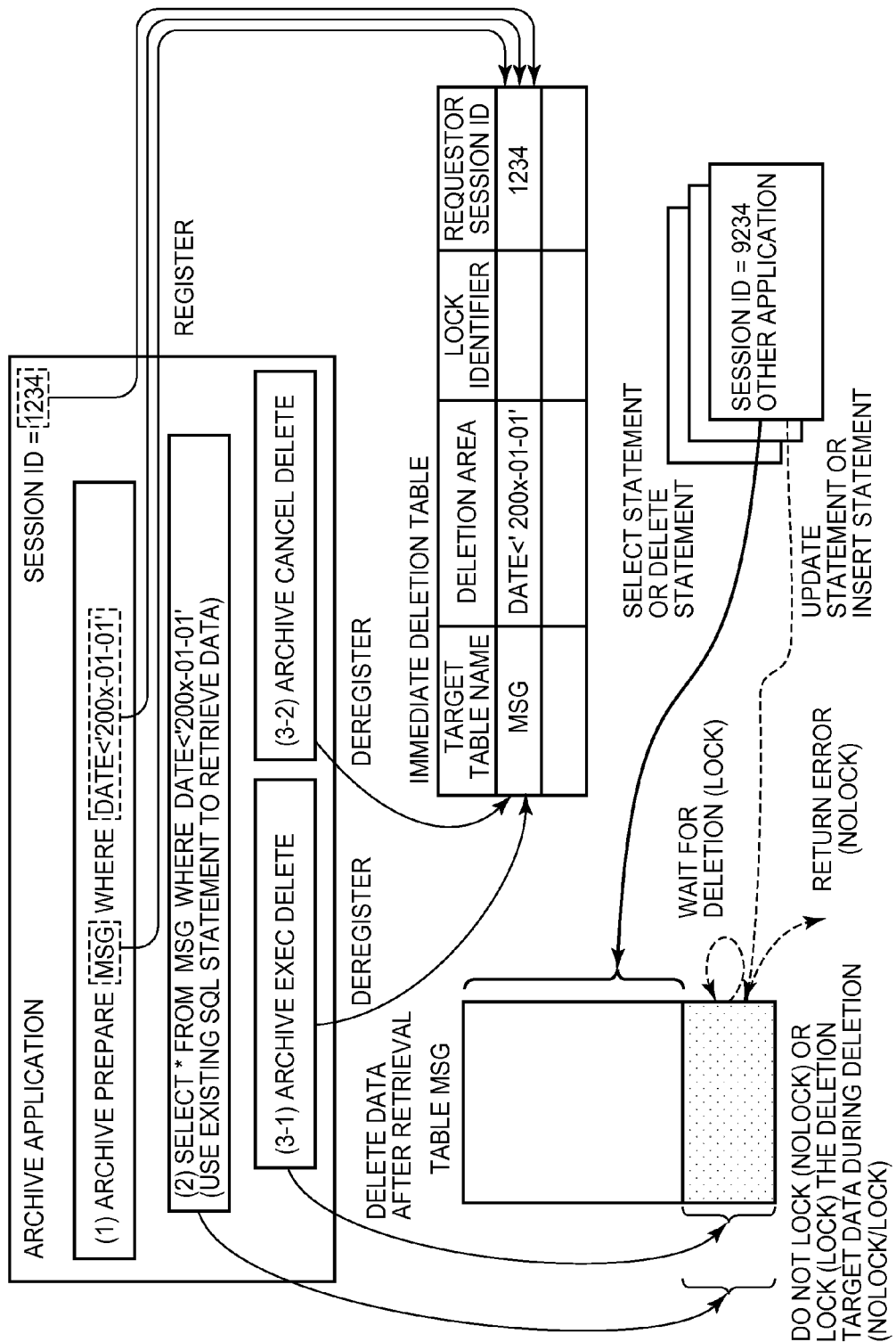
FIG. 11 schematically illustrates examples of the operations performed in an archiving process according to the second embodiment.

If it is determined in step S401 that there is no record with the matching target table name (NO), the process proceeds to step S402. In step S402, the preparation command processing unit 142 writes into the immediate deletion table 120' the target table name, the conditional expression defining the target area, and a requestor session identifier, and the process proceeds to step S404. The requestor session identifier is a value for identifying the client that has issued or requested the command. FIG. 11 schematically illustrates the operations performed in the archiving process. As shown in FIG. 11, when a preparation command is issued as a first command, a requestor session identifier (ID) is written into the immediate deletion table 120' (FIG. 8) in association with the deletion target.

With continuing reference to FIGS. 9 and 11, if it is determined in step S401 that there is a record with the matching target table name (YES), on the other hand, the process proceeds to step S403. In step S403, the preparation command processing unit 142 (FIG. 8) adds, to the condition indicating the deletion target of the received preparation command, a condition opposite to the condition indicating the target area specified in the record that has been registered in the immediate deletion table 120' (FIG. 8) and that has the matching table name specified therein. Then, in step S402, the preparation command processing unit 142 performs registration into the immediate deletion table 120' as described above, before the process proceeds to step S404.

In step S404, the preparation command processing unit 142 determines whether the value of the immediate deletion lock variable 118' is "NOLOCK" or "LOCK". If it is determined in step S404 that the value of the immediate deletion lock variable 118' (FIG. 8) is "LOCK", the process proceeds to step S405. In step S405, the preparation command processing unit 142 creates a lock for the immediate deletion command so as to lock the deletion target, and writes a lock identifier for identifying the lock into the immediate deletion table 120'. In step S408, the preparation command processing unit 142 finishes the processing regarding the preparation command.

On the other hand, if it is determined in step S404 that the value of the immediate deletion lock variable 118' is "NOLOCK", the process proceeds to step S406. In step S406, the preparation command processing unit 142 checks whether the record of the deletion target is being used by any command that had been issued prior to the immediate deletion command and that is now being processed, and determines whether it is now in use or not in step S407. If it is determined in step S407 that the deletion target record is now in use (YES), the process loops back to step S406. If it is determined in step S407 that the deletion target record is not in use (NO), the process proceeds to step S408, where the processing regarding the preparation command is finished.

(B) Inquiry Command Processing Unit and Normal Deletion Command Processing Unit

Figure 10A:
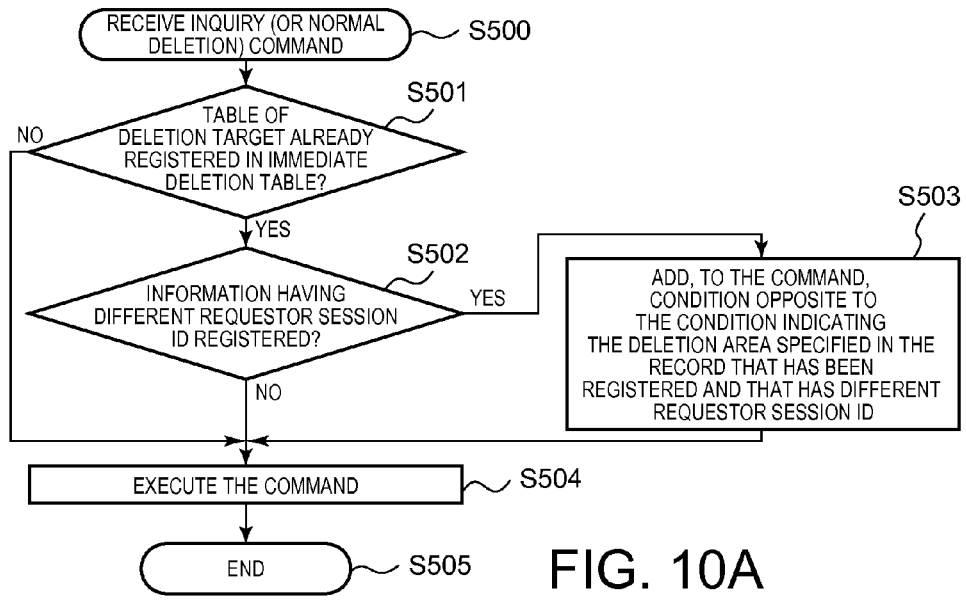
FIGS. 10A and 10B are flowcharts illustrating examples of the processing performed by the inquiry command processing unit and the update command processing unit, respectively, according to the second embodiment.

FIG. 10A is a flowchart illustrating the processing performed by the inquiry command processing unit 132' (FIG. 8) according to the second embodiment. The process shown in FIG. 10A starts at step S500 in response to the event that the command receiving unit 112' receives an inquiry command. In step S501, the inquiry command processing unit 132' refers to the immediate deletion table 120' (FIG. 8) to determine whether there is a record in the immediate deletion table 120' in which the same target table name as that in the inquiry command is specified.

If it is determined in step S501 that there is a record with the matching table name (YES), the process proceeds to step S502, where the inquiry command processing unit 132' determines whether there is a record registered in the immediate deletion table 120' that has a requestor session identifier different from that of the inquiry command. If it is determined in step S502 that there is a record having a session identifier different from that of the inquiry command (YES), the process proceeds to step S503.

In step S503, the inquiry command processing unit 132' adds, to the received inquiry command, a condition opposite to the condition indicating the target area specified in the record that has been registered in the immediate deletion table 120' and that has the matching table name specified therein and that also has a session identifier different from that of the inquiry command. In this case, in step S504, the inquiry command processing unit 132' executes the process of inquiring the range that is obtained by excluding, from the target area of the inquiry command, the target area of an archive preparation command issued by another requestor or the deletion target area in which the immediate deletion process is in progress. In step S505, the inquiry command processing unit 132' finishes the processing regarding the inquiry command.

On the other hand, if it is determined in step S501 that there is no record with the matching table name (NO), or if it is determined in step S502 that there is no record with a session identifier different from that of the inquiry command (NO), the process proceeds to step S504. In step S504, the inquiry command processing unit 132' executes the process according to the inquiry command, without adding any modification to its condition, and in step S505, the inquiry command processing unit 132' finishes the processing regarding the inquiry command.

As shown in FIG. 11, when the first preparation command is issued from an archive application, the deletion target is registered in the immediate deletion table 120' (FIG. 8) in association with the session identifier of the command requestor, and the deletion target range is set to a locked state or an unlocked state depending on the value of the immediate deletion lock variable 118' (FIG. 8).

Thereafter, in the case where an inquiry command is issued as a second command from the archive application prior to issuance of a deletion execution command, the processing of the inquiry command is executed under a normal condition, because the inquiry command has the same requestor session identifier. On the other hand, if an inquiry command is issued from another application having another session identifier assigned thereto, the inquiry command is modified such that a condition to exclude the deletion target of the first preparation command is added thereto, before execution of that inquiry command. As a result, even if the entire range of the table is inquired by another application, only the range except the target area of the archiving process is actually inquired. This avoids the undesirable event that the data in the target area of the archiving process is touched by another application and unlocking thereof is awaited.

(C) Update Command Processing Unit and Insert Command Processing Unit

Figure 10B:
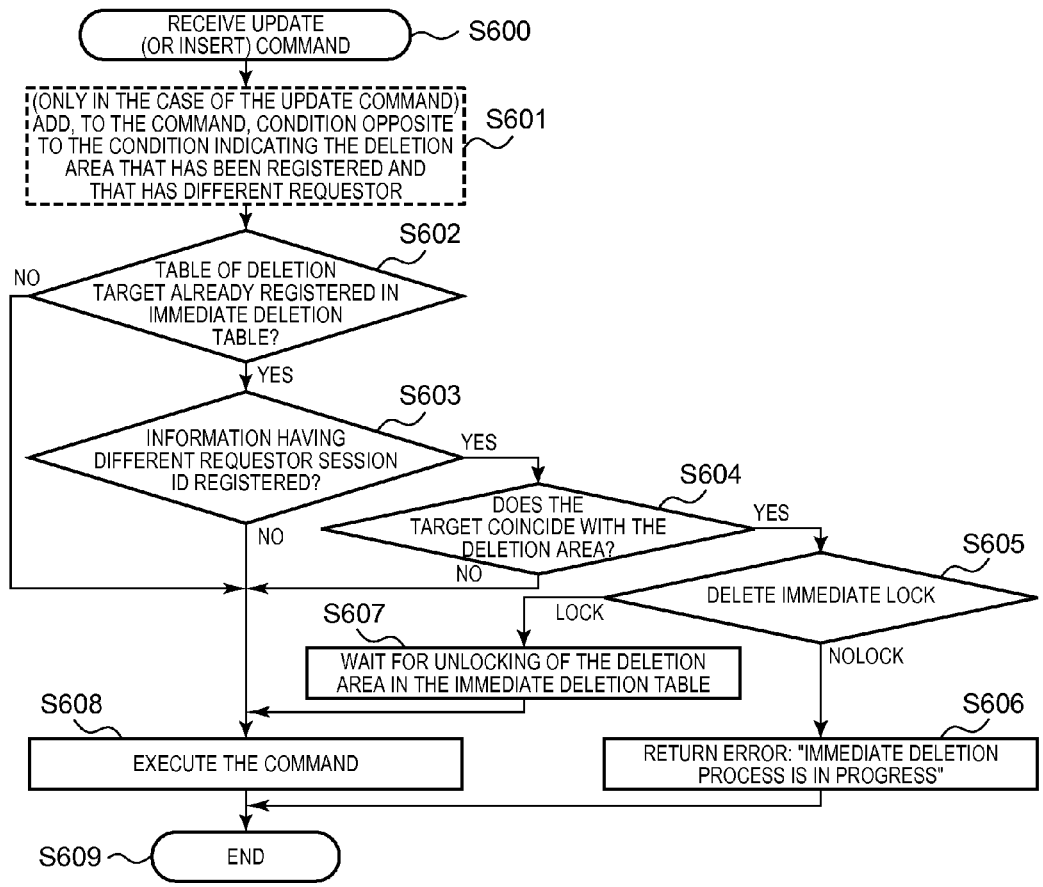

FIG. 10B is a flowchart illustrating the processing performed by the update command processing unit 136' (FIG. 8) according to the second embodiment. The process shown in FIG. 10B starts at step S600 in response to the event that the command receiving unit 112' (FIG. 8) receives an update command. As in the first embodiment, the processing performed by the insert command processing unit 138' (FIG. 8) is approximately identical to that of the update command processing unit 136', and therefore, it is described with reference to the same flowchart, in which the process solely performed for the update command is shown in the dashed frame.

In the case of the update command, in step S601, the update command processing unit 136' adds, to the update condition specified in the received update command, a condition opposite to the condition indicating the target area specified in the record that has been registered in the immediate deletion table 120' and that has the matching table name specified therein and that also has a requestor session identifier different from that of the update command, as in the case of receiving the inquiry command or the normal deletion command. In the case of the insert command, the process proceeds directly from step S600 to step S602. In step S602, the update command processing unit 136' refers to the immediate deletion table 120' to determine whether there is a record in the immediate deletion table 120' that has the same target table name as that in the update command specified therein.

If it is determined in step S602 that there is a record with the matching table name (YES), the process proceeds to step S603, where the update command processing unit 136' further determines whether there is a record registered in the immediate deletion table 120' that has a requestor session identifier different from that of the update command. If it is determined in step S603 that there is a record with a different session identifier (YES), the process proceeds to step S604. In step S604, the update command processing unit 136' further determines whether the target of the update command, i.e. the value updated according to the update command, coincides with the range of the target area specified in the record that has been registered in the immediate deletion table 120' and that has the same table name specified therein and that also has a session identifier different from that of the update command.

If it is determined in step S604 that the target of the update command coincides with any one of the target areas specified in the records having session identifiers different from that of the update command (YES), the process proceeds to step S605. In step S605, the update command processing unit 136' refers to the immediate deletion lock variable 118' (FIG. 8) to determine whether the value is "NOLOCK" or "LOCK". If it is determined in step S605 that the value is "NOLOCK", the process proceeds to step S606. As the deletion target area is not locked, in step S606, the update command processing unit 136' returns an error indicating that the immediate deletion process is in progress, to the requestor of the update command, as a response to the update command. In step S609, the update command processing unit 136' terminates the processing regarding the update command.

On the other hand, if it is determined in step S602 that there is no record with the matching table name (NO), or if it is determined in step S603 that there is no record having a session identifier different from that of the update command (NO), or if it is determined in step S604 that the update target does not coincide with any one of the target areas specified in the records having the session identifiers other than that of the update command (NO), then the process proceeds to step S608. If it is determined in step S605 that the value of the immediate deletion lock variable 118' is "LOCK", in step S607, the update command processing unit 136' waits for unlocking of the deletion area in the immediate deletion table 120', before the process proceeds to step S608. In step S608, the update command processing unit 136' executes the process according to the update command, and in step S609, the update command processing unit 136' finishes the processing regarding the update command.

Referring again to FIG. 11, in the case where an update command or an insert command the target of which coincides with the range of the deletion target according to the first preparation command is issued from another application after the issuance of the preparation command and before the issuance of the deletion execution command, it is determined, according to whether the value of the immediate deletion lock variable 118' (FIG. 8) is LOCK or NOLOCK, to continue the process of the command following the completion of the deletion process (in the case of "LOCK") or to return an error (in the case of "NOLOCK").

(D) Archive Deletion Execution Command Processing Unit

Figure 12A:
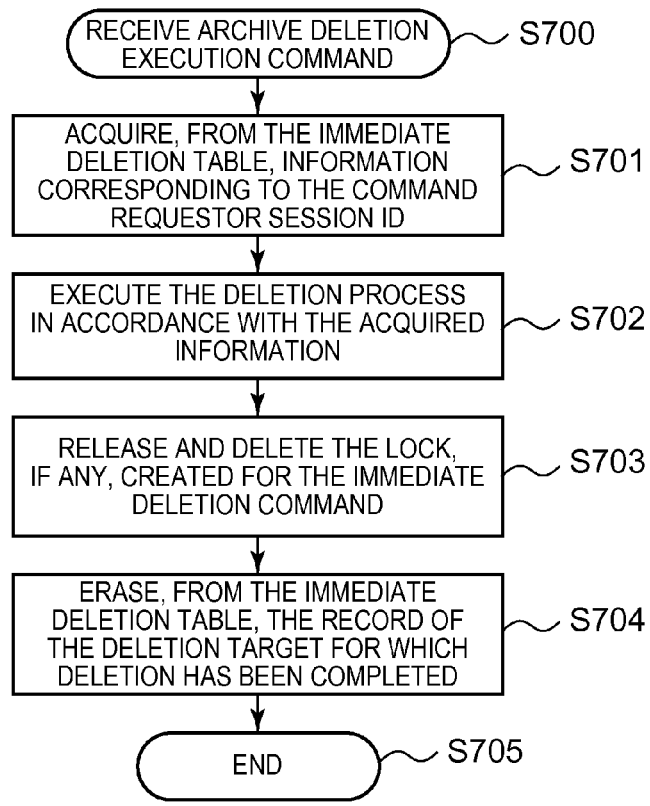
FIGS. 12A and 12B are flowcharts illustrating examples of the processing performed by a deletion execution command processing unit and a deletion cancellation command processing unit, respectively, according to the second embodiment.

FIG. 12A is a flowchart illustrating the processing performed by the deletion execution command processing unit 144 according to the second embodiment. The process shown in FIG. 12A starts at step S700 in response to the event that the command receiving unit 112' (FIG. 8) receives a deletion execution command.

In step S701, the deletion execution command processing unit 144 specifies a requestor session identifier of the received command, and acquires from the immediate deletion table 120' (FIG. 8) the target table and the conditional expression of the deletion target bound to that requestor. In step S702, in accordance with the acquired information, the deletion execution command processing unit 144 executes the process of deleting the deletion target bound to the requestor session identifier. In the case where two or more preparation commands have been issued from the same requestor prior to the issuance of the deletion execution command, the deletion execution command processing unit 144 executes the process of deleting the deletion targets according to the plurality of preparation commands altogether.

In the case of deleting records in two or more tables specified by a plurality of preparation commands, if the tables have a dependence on one another, the order of deleting the records is determined in accordance with the dependence. For example, assume that an order information table and an order details information table listing the detailed information of the orders are to be archived. In this case, the order details information table depends on the order information table, and thus, the records in the order details information table are deleted first. Such dependence can be determined according to whether a condition specifying the area to be archived includes the information of another table. For example, assume that the order information table (ORDERS) and the order details information table are associated with each other by the order ID (ORDER_ID) and it is now tried to archive the records in the order details information table that correspond to the records in the order information table having the order date (ORDER_DATE) of '200x-01-01' or earlier. This condition is expressed as follows: ORDER_ID IN (SELECT ORDER_ID FROM ORDERS). As such, the condition specifying the area to be archived in the order details information table includes the information of the order information table (ORDERS).

When the deletion process in step S702 has been completed, in step S703, the deletion execution command processing unit 144 releases and deletes the lock, if any, that had been created for the immediate deletion command, and in step S704, the deletion execution command processing unit 144 deregisters from the immediate deletion table 120' the deletion target according to the deletion execution command. In step S705, the deletion execution command processing unit 144 finishes the processing regarding the deletion execution command.

As shown in FIG. 11, when a deletion execution command is issued as a third command after the issuance of the preparation command as the first command, the actual deletion process is carried out under the locked state or the unlocked state that had been set during the process according to the first preparation command. When the deletion process is completed, the corresponding record is erased from the immediate deletion table 120'.

(E) Deletion Cancellation Command Processing Unit

Figure 12B:
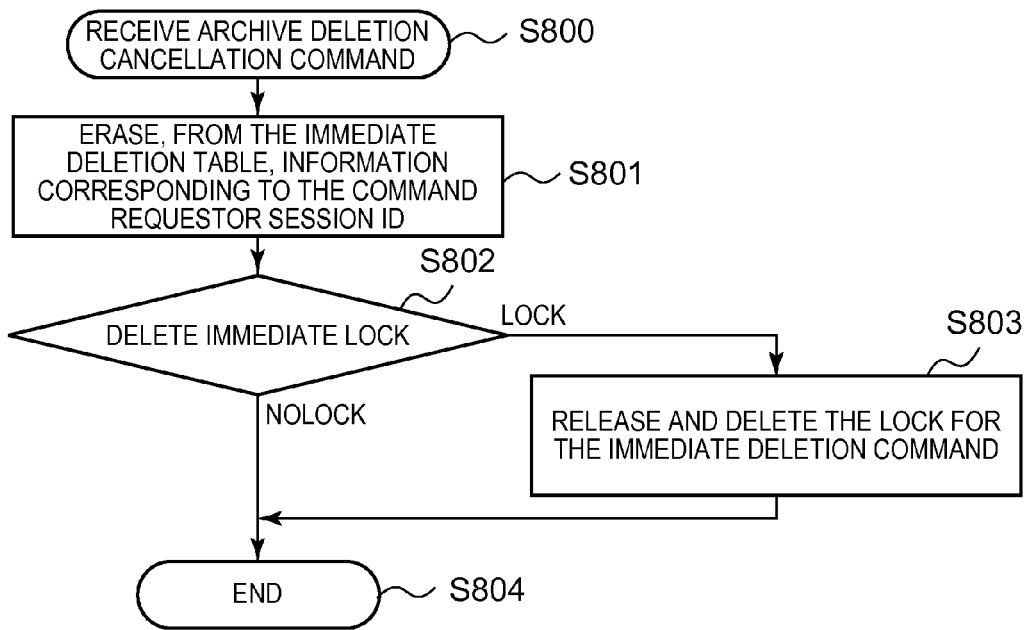

FIG. 12B is a flowchart illustrating the processing performed by the deletion cancellation command processing unit 146 (FIG. 8) according to the second embodiment. The process shown in FIG. 12B starts at step S800 in response to the event that the command receiving unit 112' (FIG. 8) receives a deletion cancellation command.

In step S801, the deletion cancellation command processing unit 146 specifies a requestor session identifier of the received command, and deregisters from the immediate deletion table 120' (FIG. 8) the deletion target bound to that requestor. In step S802, the deletion cancellation command processing unit 146 refers to the immediate deletion lock variable 118' to determine whether the value is "NOLOCK" or "LOCK". If it is determined in step S802 that the value is "NOLOCK", the process proceeds to step S804, where the processing regarding the deletion cancellation command is finished.

On the other hand, if it is determined in step S802 that the value is "LOCK", the process proceeds to step S803, where the deletion cancellation command processing unit 146 releases and deletes the lock of the deletion target bound to the requestor of the received command, and in step S804, the deletion cancellation command processing unit 146 finishes the processing regarding the deletion cancellation command.

As a result, deletion of the deletion target registered according to the preparation command is cancelled.

As shown in FIG. 11, when a deletion cancellation command is issued as a third command after the issuance of the first preparation command, in the case where the locked state has been set during the processing according to the first preparation command, the lock is released and deleted, and the corresponding record is erased from the immediate deletion table 120' (FIG. 8). This can cancel the deletion of the deletion target according to the archive preparation command.

(F) Immediate Deletion Command Processing Unit

The immediate deletion command according to the first embodiment may also be used concurrently in the second embodiment. The processing performed by the immediate deletion command processing unit 130' (FIG. 8) is identical to that in the process flow described in conjunction with FIG. 3 in the first embodiment, and thus, detailed description thereof will not be repeated here. During this processing, the common immediate deletion table 120' (FIG. 8) is used. The immediate deletion table 120' of the present embodiment includes the column of requestor session identifier, which has been provided such that, even when a deletion target according to an archive preparation command is registered in the immediate deletion table 120', only the session that has issued the archive preparation command is able to handle the deletion target data as if it were not deleted. In the process flow of the immediate deletion command, no information is written into the requestor session identifier column.

According to the archive preparation command described above, immediately after a deletion target conditioned by that command is registered in the immediate deletion table 120', the deletion target is excluded from the target of data manipulation by another application. This causes the deletion target to be seen from the other applications as if it were already deleted, even if the deletion process initiated after the issuance of a deletion execution command has not been completed yet. The application as the requestor of the archive preparation command, however, can refer to the deletion target, ensuring proper data retrieval in the archiving process. Furthermore, the actual deletion process according to the deletion execution command can enjoy the advantages similar to those in the deletion process according to the immediate deletion command described above. As a result, the amount of memory usage is reduced, and occurrence of lock escalation is favorably avoided.

Third Embodiment

In the DB system 100' according to the second embodiment described above, for retrieving data from a database after the issuance of an archive preparation command, another command is issued to the same database. The data retrieval however imposes a heavy load as well, and thus, it may be desirable to reduce the load. Hereinafter, a third embodiment will be described which provides a data retrieval method using a replication database. Each DB server in the DB system of the third embodiment is similar in hardware and software configurations to that of the second embodiment, and thus, differences therebetween will primarily be described below. The elements exerting similar functions to those in the first or second embodiment are denoted by the same symbols with ["] added.

Figure 13:
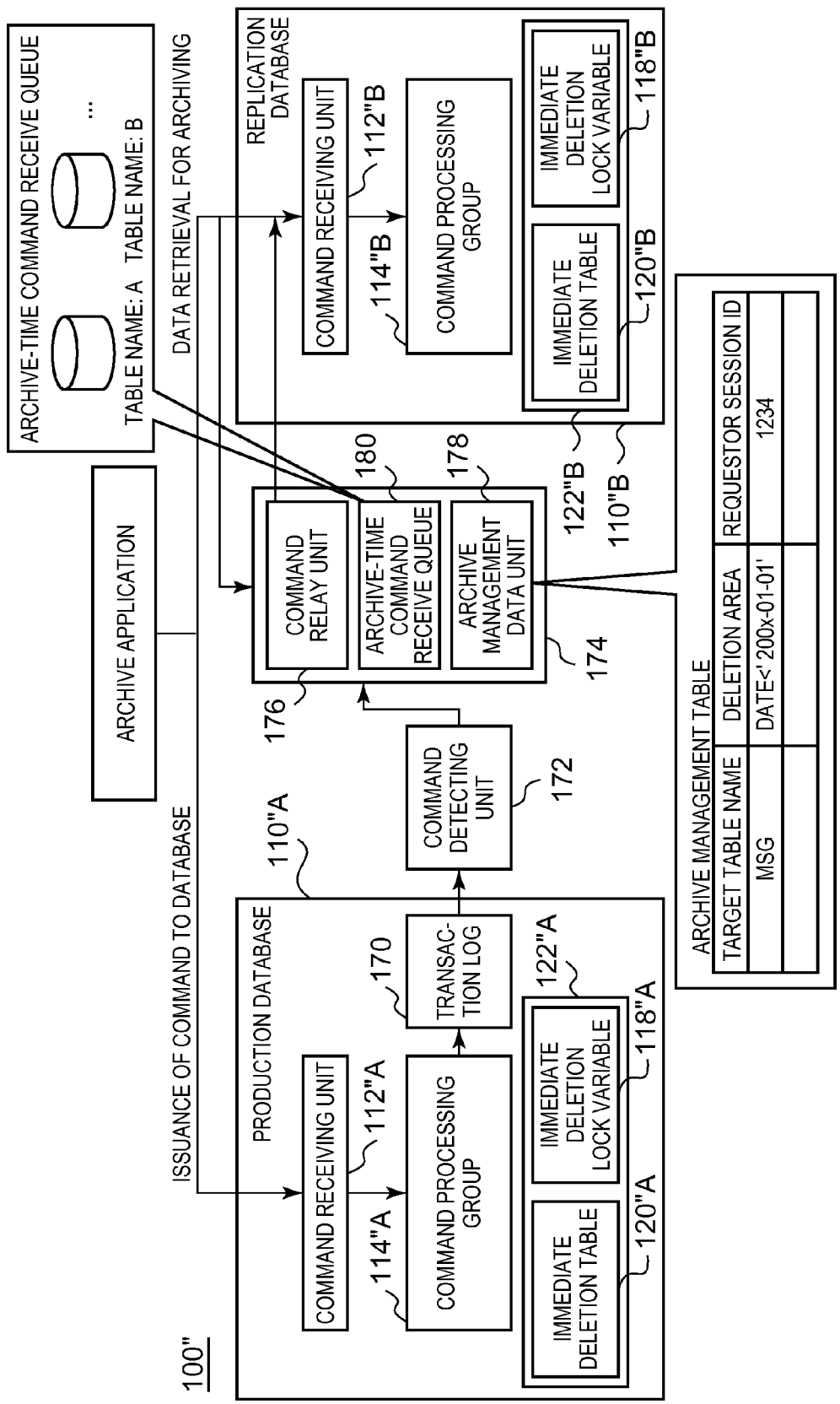
FIG. 13 is a functional block diagram of an example of a database system according to a third embodiment.

FIG. 13 shows functional blocks which are implemented on a DB system 100" according to the third embodiment. The DB system 100" of the present embodiment is made up of one or more DB servers, and includes a production database 110"A serving as a master and a replication database 110"B obtained from the production database 110"A. The production database 110"A and the replication database 110"B are normally implemented on different hardware components. These databases 110" each have the configuration similar to that of the second embodiment, and includes a command receiving unit 112", a command processing group 114" provided with an immediate deletion command processing unit 130" and archive-related command processing units 142" to 146", details of which will not be provided here, and a deletion target management data unit 122" which stores an immediate deletion lock variable 118" and an immediate deletion table 120".

In the production database 110"A, various kinds of commands received by a command receiving unit 112"A provided therein are each temporarily stored as a transaction log 170, and transmitted to the replication database 110"B on a timely basis. To this end, the DB system 100" of the present embodiment includes, on the DB server of the production database 110"A side, a command detecting unit 172 which acquires the transaction log 170 and transfers each command received by the production database 110"A to the replication database 110"B side. The DB system 100" further includes, on the DB server of the replication database 110"B side, functional units indicated by a rectangle 174 in FIG. 13.

The functional units provided on the replication database 110"B side include: a command relay unit 176 which receives various commands transferred from the command detecting unit 172 and transmits the commands to a command receiving unit 112"B in the replication database 110"B; an archive management data unit 178 which stores an archive management table for managing archiving by replication; and a command receive queue for use in archiving (hereinafter, referred to as the "archive-time command receive queue") 180, which temporarily queues insert, update, normal deletion, immediate deletion, and other commands related to a table in which the archiving process is in progress. The archive management table, having a data structure similar to that of the immediate deletion table described above in the second embodiment, is used for storing a target table, a deletion area, and a requestor session identifier of the preparation command to be transferred.

The archiving process according to the present embodiment is characterized in that a preparation command is issued to the production database 110"A so as to cause its deletion target to be immediately excluded from a data manipulation target of another application in the production database 110"A, while the data can be retrieved from the replication database 110"B.

The command relay unit 176 according to the present embodiment receives commands that were issued to and transferred from the production database 110"A and transfers the commands to the replication database 110"B. The command relay unit 176 executes the following processes in accordance with the types and conditions of the respective commands. In the case where the command relay unit 176 receives a preparation command issued to the production database 110"A, the command relay unit 176 registers a deletion target conditioned by the preparation command into the archive management table, without transmitting the command to the replication database 110"B. In the case where the command relay unit 176 receives an update command, an insert command, a normal deletion command, or an immediate deletion command with respect to a table, if the target table of the command has been registered in the archive management table, the command relay unit 176 temporarily stores the command in the archive-time command receive queue 180, rather than immediately transmitting the command to the replication database 110"B.

Further, in the case where the command relay unit 176 receives a deletion execution command, the command relay unit 176 does not transmit the deletion execution command to the replication database 110"B. Instead, the command relay unit 176 issues to the replication database 110"B an immediate deletion command for the deletion target that has been registered in the archive management table and that has the same requestor, and deregisters the deletion target from the archive management table. In the case where there are any commands in the archive-time command receive queue 180 that are related to the table in which the archiving process has been completed, the command relay unit 176 issues the commands to the replication database 110"B in the order in which the commands were received.

Furthermore, in the case where the command relay unit 176 receives a deletion cancellation command, the command relay unit 176 does not transmit the deletion cancellation command to the replication database 110"B. Rather, the command relay unit 176 deregisters from the archive management table the deletion target having the same requestor. In the case where there are any commands in the archive-time command receive queue 180 that are related to the table in which the archiving process has been completed, the command relay unit 176 issues the commands to the replication database 110"B in the order in which the commands were received. On the other hand, in the case where the command relay unit 176 receives a command issued to the production database 110"A that does not satisfy any of the above conditions, the command relay unit 176 transmits the command to the replication database 110"B.

It is noted that the command relay unit 176 according to the present embodiment is implemented on a computer as a command relay unit of the present embodiment, although the command relay unit 176 can also be regarded as a functional unit that corresponds to the registration processing unit and the deletion processing unit described above. Hereinafter, the archiving process using the replication database of the present embodiment will be described in more detail.

(A) Command Detecting Unit

Figure 14A:
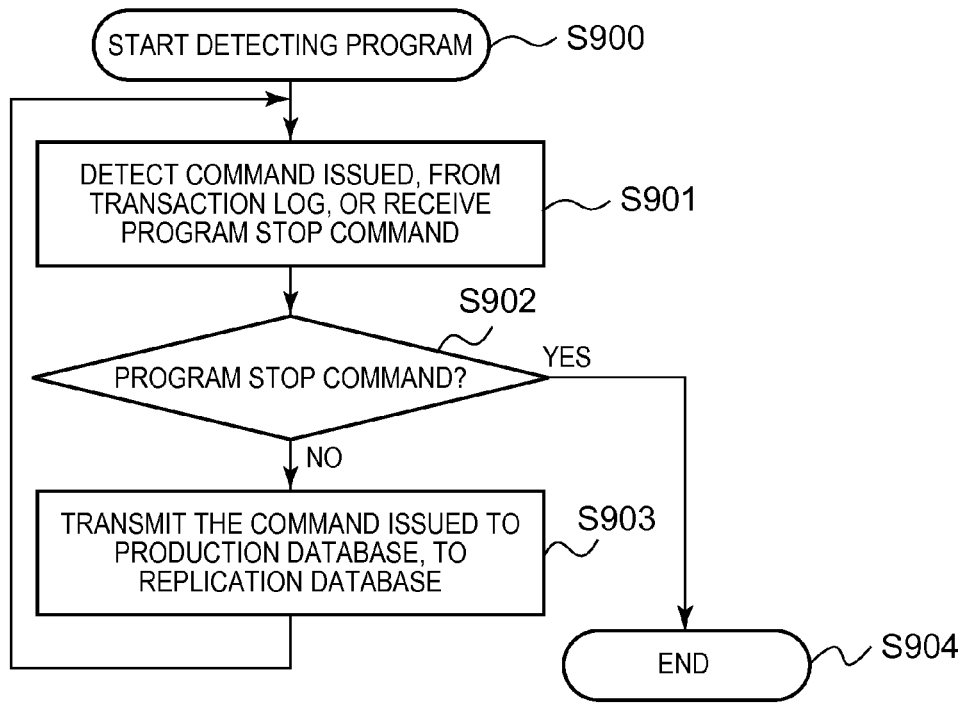
FIG. 14A is a flowchart illustrating an example of the processing performed by a command detecting unit according to the third embodiment.

FIG. 14A is a flowchart illustrating the processing performed by the command detecting unit 172 (FIG. 13) according to the third embodiment. The process shown in FIG. 14A starts at step S900 in response to the event that the command detecting program is started. In step S901, the command detecting unit 172 detects from the transaction log 170 (FIG. 13) a command that has been issued to the production database 110"A, or receives a stop command of the program. In step S902, the command detecting unit 172 determines whether the command is the stop command of the program.

If it is determined in step S902 that the command is the stop command (YES), the process proceeds to step S904, where the process is terminated. On the other hand, if it is determined in step S902 that the command is not the stop command but the issued command that has been detected (NO), the process proceeds to step S903. In step S903, the command detecting unit 172 transmits the command, issued to the production database 110"A (FIG. 13), to the command relay unit 176 (FIG. 13) on the replication database 110"B (FIG. 13) side, and the process loops back to step S901. This loop is repeated until a program stop command is received.

(B) Command Relay Unit

Figure 15:
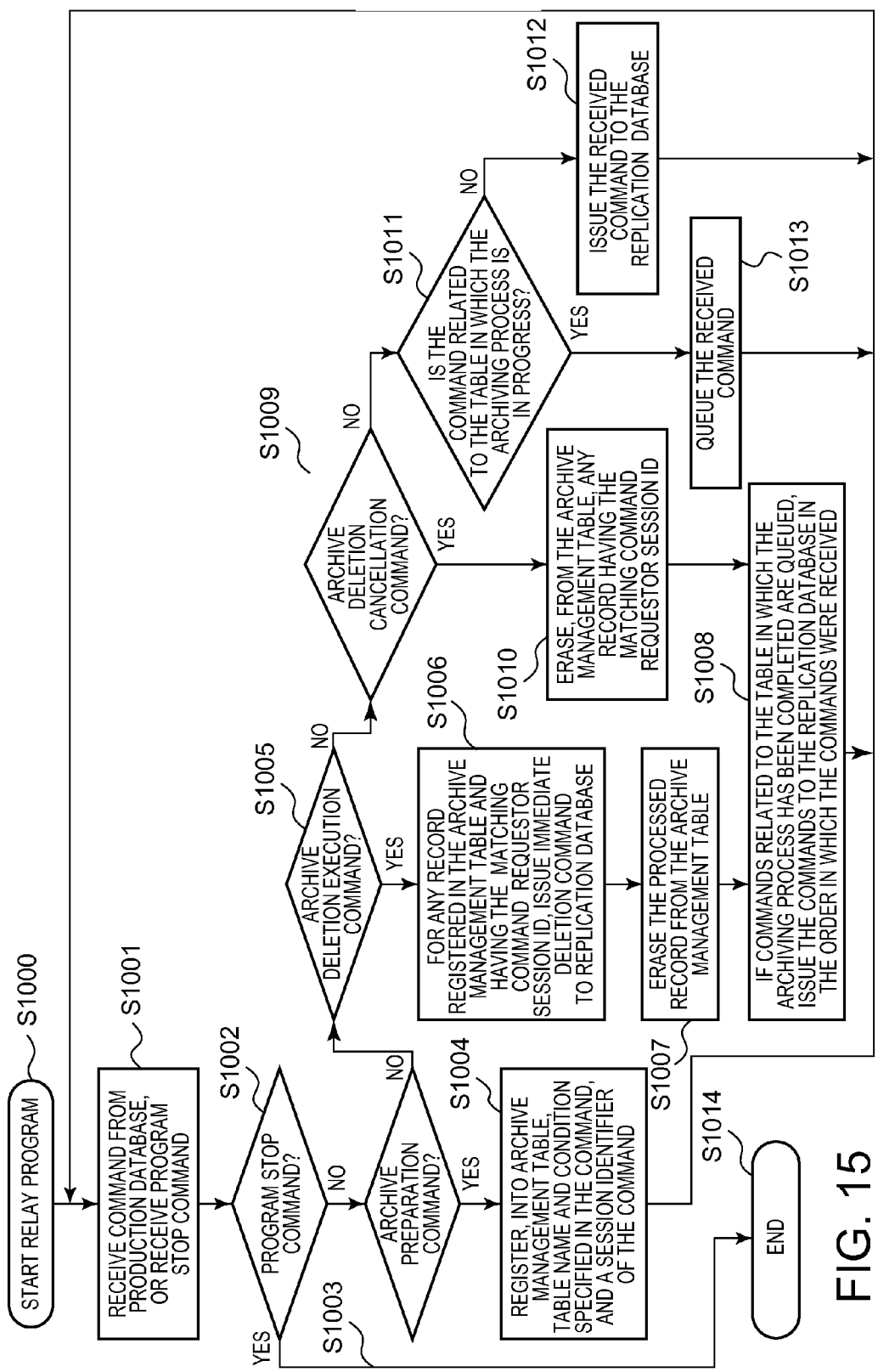
FIG. 15 is a flowchart illustrating an example of the processing performed by the command relay unit according to the third embodiment.

FIG. 15 is a flowchart illustrating the processing performed by the command relay unit 176 (FIG. 13) according to the third embodiment. The process shown in FIG. 15 starts at step S1000 in response to the event that the command relay program is started. In step S1001, the command relay unit 176 receives a command transferred from the command detecting unit 172 (FIG. 13), or receives a stop command of the program. In step S1002, the command relay unit 176 determines whether the command is the stop command of the program. If it is determined in step S1002 that the command is the stop command (YES), the process proceeds to step S1014, where the process is terminated. On the other hand, if it is determined in step S1002 that the command is not the stop command but the issued command that has been detected (NO), the process proceeds to step S1003.

In step S1003, the command relay unit 176 determines whether the received command is a preparation command. If it is determined in step S1003 that the command is the preparation command (YES), the process proceeds to step S1004. In step S1004, the command relay unit 176 registers, into the archive management table, a target table and a target area of the deletion target conditioned by the preparation command, and a session identifier of the command. The process then loops back to step S1001. The process is repeated until a program stop command is received. On the other hand, if it is determined in step S1003 that the command is not the preparation command (NO), the process proceeds to step S1005.

In step S1005, the command relay unit 176 determines whether the received command is a deletion execution command. If it is determined in step S1005 that the command is the deletion execution command (YES), the process proceeds to step S1006. In step S1006, the command relay unit 176 (FIG. 13) issues to the replication database 110"B (FIG. 13) an immediate deletion command for the deletion target having the same requestor session identifier as that of the deletion execution command. In step S1007, the command relay unit 176 erases from the archive management table the record of the deletion target for which the immediate deletion command has been issued.

In step S1008, in the case where there are any commands in the archive-time command receive queue 180 (FIG. 13) that are related to the table in which the archiving process has been completed, the command relay unit 176 issues the commands to the replication database 110"B in the order in which the commands were received, and the process loops back to step S1001. On the other hand, if it is determined in step S1005 that the command is not the deletion execution command (NO), the process proceeds to step S1009.

In step S1009, the command relay unit 176 determines whether the received command is a deletion cancellation command. If it is determined in step S1009 that the command is the deletion cancellation command (YES), the process proceeds to step S1010. In step S1010, the command relay unit 176 erases from the archive management table any record having the same requestor session identifier as that of the deletion cancellation command, and the process proceeds to step S1008.

In step S1008, in the case where there are any commands in the archive-time command receive queue 180 that are related to the table in which the archiving process has been completed, the command relay unit 176 issues the commands to the replication database 110"B in the order in which the commands were received, and the process loops back to step S1001. On the other hand, if it is determined in step S1009 that the command is not the deletion cancellation command (NO), the process proceeds to step S1011.

In step S1011, the command relay unit 176 determines whether the command that is other than the archive-related commands is related to the table in which the archiving process is in progress. If it is determined in step S1011 that the command is related to the table in which the archiving process is in progress (YES), in step S1013, the command relay unit 176 temporarily stores the command in the archive-time command receive queue 180. If it is determined in step S1011 that the command is not related to the table in which the archiving process is in progress (NO), in step S1012, the command relay unit 176 issues the command as it is to the replication database 110"B, and the process loops back to step S1001.

Figure 14B:
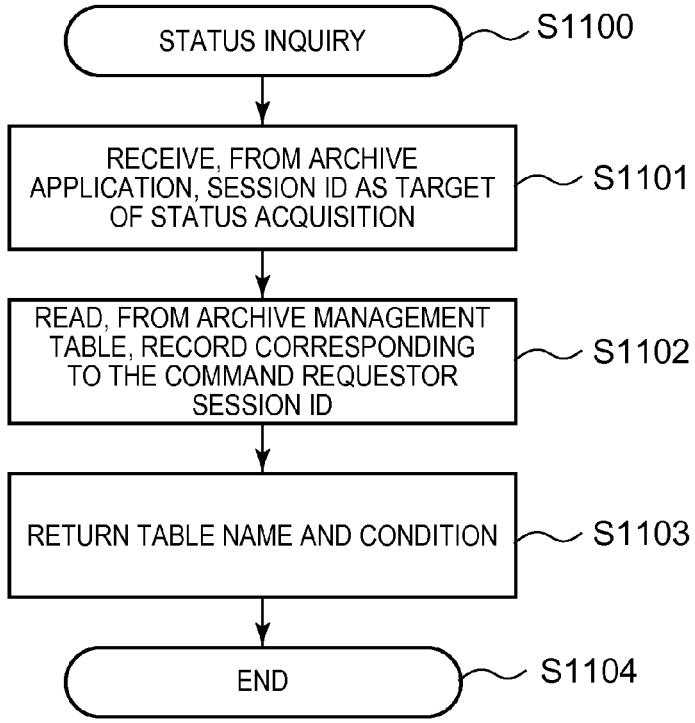
FIG. 14B is a flowchart illustrating an example of the processing performed by a command relay unit in response to an inquiry about the status of the archiving process from a client.

FIG. 14B is a flowchart illustrating the processing performed by the command relay unit 176 (FIG. 13) according to the third embodiment in response to an inquiry from a client about the status of the archiving process. The process shown in FIG. 14B starts at step S1100 in response to the event that a command inquiring about the status of the archiving process is received from an archive application on the client. In step S1101, the command relay unit 176 receives from the archive application a session identifier as a target of status acquisition.

In step S1102, the command relay unit 176 reads from the archive management table the record that has the acquired session identifier, and in step S1103, the command relay unit 176 returns the table name and the conditional expression specified in that record as a response to the inquiry. In step S1104, the command relay unit 176 finishes the process. It is noted that there is a time lag until the command included in the transaction log 170 is transmitted to the replication database side. Thus, the status inquiry is issued for confirmation as to whether the archive preparation command issued to the production database 110"A (FIG. 13) has reached the replication database 110"B (FIG. 13).

(C) Archive Application

Figure 16:
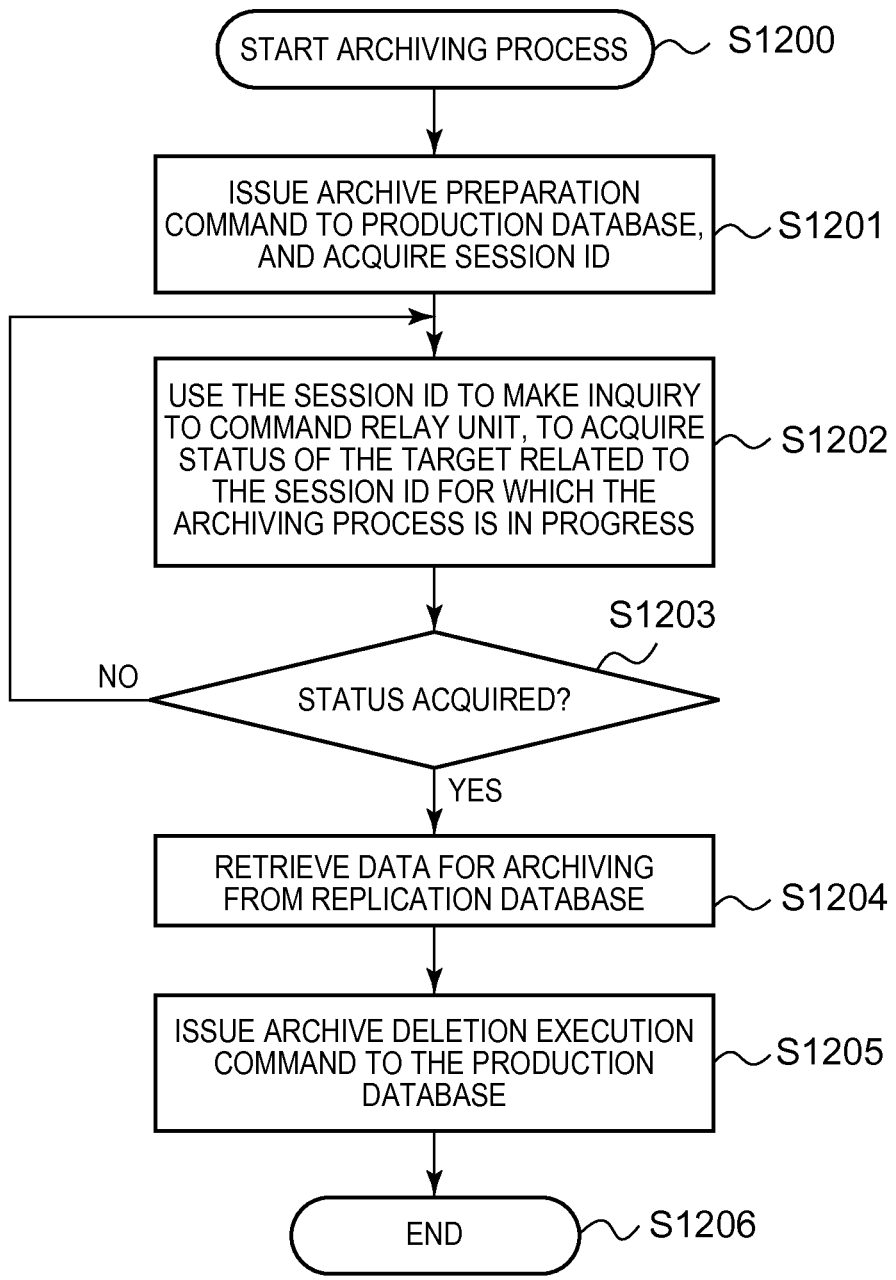
FIG. 16 is a flowchart illustrating an example of the processing performed by an archive application which operates on the client in the database system according to the third embodiment.

In the DB system 100" according to the present embodiment, the archive application is able to execute archiving in the production database 110"A in accordance with a process flow as will be described below. FIG. 16 is a flowchart illustrating the processing performed by the archive application which operates on the client in the DB system 100" (FIG. 13) of the third embodiment.

The process shown in FIG. 16 starts at step S1200 in response to an archive instruction issued from an operator, for example. In step S1201, the application issues a preparation command to the production database 110"A (FIG. 13), and acquires a session ID. When the preparation command is issued, the production database 110"A registers a deletion target of the preparation command into the immediate deletion table 120"A (FIG. 13), and transfers the preparation command to the command relay unit 176 (FIG. 13) on the replication database 110"B side on a timely basis.

As a result, on the production database 110"A side, the deletion target conditioned by the preparation command is excluded at least from a manipulation target of another application. On the replication database 110"B side, the command relay unit 176 receives the preparation command issued to the production database 110"A, and registers its deletion target into the archive management table. While the archive application will access the replication database 110"B with a different session identifier, no preparation command is issued to the replication database 110"B, and thus, the archive application is also accessible to the deletion target prepared for archiving in the replication database 110"B.

In step S1202, the application makes an inquiry to the command relay unit 176 so as to acquire the status of the archiving process related to the session identifier acquired. In step S1203, the application determines whether it was able to acquire the status. If it is determined in step S1203 that it failed to acquire the status (NO), the application waits for a while before the process loops back to step S1202. The process is repeated until the status is acquired or until a timeout occurs. On the other hand, if it is determined in step S1203 that the status has been acquired (YES), the process proceeds to step S1204. With this status confirmation, it is possible to confirm that the deletion target according to the preparation command issued to the production database 110"A has been registered in the archive management table.

In step S1204, the application retrieves data from the replication database 110"B with an existing SQL statement or the like. When the retrieval of necessary data has been completed, in step S1205, the application issues a deletion execution command to the production database 110"A, and finishes the process in step S1206.

The production database 110"A, upon receipt of this deletion execution command, executes the process of deleting the deletion target according to the preparation command registered in the immediate deletion table 120"A, and upon completion of the deletion process, deregisters the deletion target from the immediate deletion table 120"A. The production database 110"A also transfers the deletion execution command to the command relay unit 176 on the replication database 110"B side on a timely basis.

On the replication database 110"B side, upon receipt of the deletion execution command, the command relay unit 176 issues to the replication database 110"B an immediate deletion command for the deletion target that has been registered in the archive management table and that has the same requestor. The command relay unit 176 also deregisters the deletion target from the archive management table. In the state of the archive management table shown in FIG. 13, when a deletion execution command is received from the same requestor (having the session identifier "1234"), a command "DELETE IMMEDIATE FROM MSG WHERE DATE<'200x-01-01'", for example, is issued to the replication database. In response thereto, in the replication database 110"B, the deletion target according to the immediate deletion command is registered into the immediate deletion table 120"B in the deletion target management data unit 122"B, and the deletion target is deleted from the replication database 110"B. The deletion target for which the deletion process has been completed is deregistered from the immediate deletion table 120"B.

According to the archiving process of the third embodiment described above, in the production database 110"A, the deletion target conditioned by the archive preparation command is excluded from a target of data manipulation by another application immediately after the deletion target is registered in the immediate deletion table 120"A. On the other hand, in the replication database 110"B, the deletion target is not yet excluded from the target of data manipulation, and thus, the data can be retrieved from the replication database 110"B even after the issuance of the archive preparation command. This enables the load imposed by the data retrieval to be isolated from the production database 110"A.

As described above, according to embodiments of the present invention, it is possible to provide an information processor, an information processing system, a data archiving method, and a data deletion method which ensure that a deletion target the deletion of which has actually been requested or a deletion target which is to be deleted in an archiving process is excluded from a target of data manipulation immediately after a command instructing immediate processing is received, irrespective of the transaction isolation level, and that, from an application that is not supposed to refer to the data being deleted, the deletion target is seen as if it were already deleted from a database. This prevents the data of the deletion target from being referred to, and accordingly, avoids the undesirable event that the data that is to be deleted and thus should not exist is included in the result of inquiry, or that the process waits for unlocking of the deletion target area.

While the functional units and processing performed thereby have been described above for easy understanding of the present invention, the present invention is not limited to the specific functional units performing specific processing as described above. The functions for implementing the above-described processing may be assigned to any functional units, in consideration of processing efficiency as well as programming efficiency upon implementation.

The above-described functions of the present invention may be implemented using a device-executable program which is written in an object-oriented programming language such as C++, Java (registered trademark), Java (registered trademark) Beans, Java (registered trademark) Applet, Java (registered trademark) Script, Perl, Ruby, or the like, or in a database language such as SQL or the like. The program may be stored in a device-readable storage medium for distribution or may be transmitted for distribution.

While embodiments of the present invention have been described with reference to the specific details, the present invention is not restricted to the above-described details. Rather, various additions, modifications, deletions, as well as other embodiments are possible within the range conceivable by those skilled in the art, and they are included in the scope of the embodiments of the present invention as long as they exert the functions and effects of the present invention.

I claim:

1. A method, performed by a computer, for archiving data stored in a database, comprising:
    receiving an archive preparation command which conditions an immediate deletion target that is to be retrieved for archiving and then deleted from the database;
    registering information defining the immediate deletion target according to the archive preparation command into a management data unit provided by computer storage, the information to prevent access to the immediate deletion target by another data manipulation command, the information defining the immediate deletion target includes an expression defining a target area;
    reading from the management data unit the intended immediate deletion target registered therein and starting the process of deleting the intended immediate deletion target from the database in a state where the immediate deletion target is not locked; and
    receiving an update or insert command having a manipulation target that coincides with a table of the immediate deletion target that has been registered in the management data;
    processing the update or insert command in a state where a condition to exclude the immediate deletion target from the manipulation target is added to the update or insert command, the condition including an expression opposite to the expression defining the target area;
    returning an error to the source of the update or insert command indicating that it is not possible to execute the update or insert command; and
    in response to the completion of the deletion process, deregistering from the management data unit the immediate deletion target the deletion of which has been completed.

2. The data archiving method according to claim 1, wherein the data manipulation command is received prior to the completion of the deletion process, and the condition added to the data manipulation command causes the immediate deletion target to be untouched during the processing of the data manipulation command.

3. The data archiving method according to claim 1, wherein the data management unit includes an immediate deletion table, and the information defining the immediate deletion target is added to the immediate deletion table and includes a table name identifying a target table and a target area within the target table.

4. A method, performed by a computer, for deleting data from a database, comprising:
    receiving an immediate deletion command having a deletion target to be immediately deleted from the database conditioned therein;
    registering information defining the deletion target according to the immediate deletion command into a management data unit provided by computer storage, the information to prevent access to the deletion target by another data manipulation command, the information defining the immediate deletion target includes an expression defining a target area;
    starting a process of deleting the deletion target according to the immediate deletion command from the database in a state where the records containing the deletion target are unlocked;
    in a case where an update or insert command is received which has a manipulation target that coincides with a table of the deletion target that has been registered in the management data unit: processing the update or insert command in the state where a condition to exclude the deletion target from the manipulation target is added to the data manipulation command, the condition including an expression opposite to the expression defining the target area;
    and returning an error to the source of the update or insert command indicating that it is not possible to execute the update or insert command; and
    in response to the completion of the deletion process, deregistering from the management data unit the deletion target the deletion of which has been completed.

5. The data deletion method according to claim 4, wherein the data manipulation command is received prior to the completion of the deletion process, and the condition added to the data manipulation command causes the immediate deletion target to be untouched during the processing of the data manipulation command.

6. The data deletion method according to claim 4, wherein the data management unit includes an immediate deletion table, and the information defining the immediate deletion target is added to the immediate deletion table and includes a table name identifying a target table and a target area within the target table.

7. A method for archiving data, comprising the steps, performed by a command relay unit, of:
    receiving an archive preparation command issued to a production database, the archive preparation command conditioning an immediate deletion target that is to be retrieved for archiving and then deleted from the production database and a replication database, wherein the replication database is replicated from the production database by a plurality of computers;
    registering information defining the immediate deletion target conditioned by the archive preparation command into an archive management data unit provided by computer storage, the information to prevent access to the immediate deletion target by another data manipulation command, the information defining the immediate deletion target includes an expression defining a target area;

receiving a data management command related to a table of the immediate deletion target registered in the archive management data unit, and queuing the data manipulation command;

receiving an archive deletion execution command issued to the production database, the archive deletion execution command instructing execution of the deletion of the intended deletion target;

issuing to the replication database an immediate deletion command for the deletion target that has been registered in the archive management data unit;

deregistering from the archive management data unit the deletion target for which the immediate deletion command has been issued; and issuing to the replication database any of the queued data manipulation commands that is related to the table of the deregistered deletion target;

the method further comprising the steps, performed by the replication database, of:

in response to the immediate deletion command, registering information defining the immediate deletion target conditioned by the immediate deletion command into a deletion target management data unit;

deleting the immediate deletion target conditioned by the immediate deletion command from the replication database;

in a case where a data manipulation command is received which has a manipulation target that coincides with the table of the immediate deletion target that has been registered in the deletion target management data unit, processing the data manipulation command in a state where a condition to exclude the immediate deletion target from the manipulation target is added to the data manipulation command, the condition including an expression opposite to the expression defining the target area; and deregistering from the deletion target management data unit the immediate deletion target the deletion of which has been completed.

8. The data archiving method according to claim 7, wherein the data manipulation command is received prior to the completion of the deletion process, and the condition added to the data manipulation command causes the immediate deletion target to be untouched during the processing of the data manipulation command.

9. The data archiving method according to claim 7, wherein the information defining the immediate deletion target includes an expression defining a target area and the condition added to the data manipulation command includes an expression opposite to the expression defining the target area.

10. The data archiving method according to claim 7, wherein the deletion target management unit includes an immediate deletion table, and the information defining the immediate deletion target is added to the immediate deletion table and includes a table name identifying a target table and a target area within the target table.

* * * * *